United States Patent
Wang et al.

(10) Patent No.: US 11,150,872 B2
(45) Date of Patent: Oct. 19, 2021

(54) COMPUTATIONAL UNITS FOR ELEMENT APPROXIMATION

(71) Applicant: SambaNova Systems, Inc., Palo Alto, CA (US)

(72) Inventors: Mingran Wang, San Jose, CA (US); Xiaoyan Li, San Jose, CA (US); Mark Luttrell, Cedar Park, TX (US); Yongning Sheng, San Jose, CA (US); Gregory Frederick Grohoski, Bee Cave, TX (US)

(73) Assignee: SambaNova Systems, Inc., Palo Alto, CA (US)

( * ) Notice: Subject to any disclaimer, the term of this patent is extended or adjusted under 35 U.S.C. 154(b) by 81 days.

(21) Appl. No.: 16/718,094

(22) Filed: Dec. 17, 2019

(65) Prior Publication Data

US 2021/0182021 A1 Jun. 17, 2021

(51) Int. Cl.
*G06F 7/485* (2006.01)
*G06F 5/01* (2006.01)

(52) U.S. Cl.
CPC ............... *G06F 7/485* (2013.01); *G06F 5/01* (2013.01)

(58) Field of Classification Search
CPC .................................. G06F 5/01; G06F 7/485
See application file for complete search history.

(56) References Cited

U.S. PATENT DOCUMENTS

| 10,698,853 | B1 | 6/2020 | Grohoski et al. | |
| 2017/0054449 | A1* | 2/2017 | Mani | H03M 7/40 |
| 2017/0244982 | A1* | 8/2017 | Fuldseth | H04N 19/86 |
| 2018/0174022 | A1 | 6/2018 | Young | |
| 2018/0220144 | A1* | 8/2018 | Su | H04N 19/30 |

(Continued)

OTHER PUBLICATIONS

MISB ST 1201.4, "Floating Point to Integer Mapping", pp. 1-21. (Year: 2019).*

(Continued)

*Primary Examiner* — Chuong D Ngo
(74) *Attorney, Agent, or Firm* — Haynes Beffel & Wolfeld LLP; Mark A. Haynes; Sikander M. Khan

(57) ABSTRACT

Herein are disclosed computation units for element approximation. A computation unit may include a first circuit to compute a first projection $\pi$ of an input element $x_i$ from a first range to a second range. In the first circuit, the input element $x_i$ may have a first format and the projected element $y_i$ may have a second format. In addition, in the first circuit, the second format may have more bits than the first format. The computation unit may further include a second circuit operatively coupled to the first circuit to produce a reduction $z_i$ in the first format using the projected element $y_i$ in the second format. The computation unit may also include a third circuit operatively coupled to the second circuit to compute a second projection $\rho$ of the reduction $z_i$ from the second range to the first range to produce an approximation $w_i$.

21 Claims, 18 Drawing Sheets

(56) References Cited

U.S. PATENT DOCUMENTS

| | | |
|---|---|---|
| 2019/0042924 A1 | 2/2019 | Pasca et al. |
| 2019/0147323 A1 | 5/2019 | Li et al. |
| 2019/0205734 A1 | 7/2019 | Guntoro |
| 2020/0159544 A1 | 5/2020 | Shah et al. |
| 2020/0159692 A1 | 5/2020 | Shah et al. |
| 2020/0371805 A1* | 11/2020 | Lutz .................. G06F 9/30036 |

OTHER PUBLICATIONS

"Activation Function," Downloaded from Wikipedia on Aug. 16, 2019, 3 pages.

Basterretxea et al., "Approximation of sigmoid function and the derivative for hardware implementation of artificial neurons," IEE Proceedings—Circuits, Devices and Systems, vol. 151, Issue 1, Feb. 5, 2004, 7 pages.

Bendersky "The Softmax function and its derivative," https://eli.thegreenplace.net/2016/the-softmax-function-and-its-derivative, Oct. 18, 2016, 11 pages.

Cook, "Comparing bfloat16 range and precision to other 16-bit numbers," www.johndcook.com/blog/2018/11/15/bfloat16, downloaded on Nov. 15, 2018, 4 pages.

Eppler et al. ,"High speed neural network chip for trigger purposes in high energy physics," IEEE, Proc. of the conference on design, automation and test in Europe, Feb. 1998, 8 pages.

Gomar et al. "Precise digital implementations of hyperbolic tanh and sigmoid function," 2016 50th Asilomar Conference on Signals, Systems and Computers, Nov. 6-9, 2016, 4 pages.

Intel BLOAT16—Hardware Numerics Definition White Paper, Rev. 1.0, Nov. 2018, 7 pages.

Ioffe, et al., "Batch Normalization: Accelerating Deep Network Training by Reducing Internal Covariate Shift," Cornell University, available at https://arxiv.org/abs/1502.03167, Mar. 2, 2015, 11 pages.

Koeplinger et al., "Spatial: A Language and Compiler for Application Accelerators," PLDI '18, Jun. 18-22, 2018, Association for Computng Machinery, 16 pages.

Lin et al., "A Digital Circuit Design of Hyperbolic Tangent Sigmoid Function for Neural Networks," 2018 IEEE Int'l Symp. on Circuits and Systems, May 18-21, 2018, 4 pages.

Petersen, "Softmax with cross-entropy," https://mattpetersen.github.io/softmax-with-cross-entropy, Jun. 25, 2017, 19 pages.

Prabhakar, et al., "Plasticine: A Reconfigurable Architecture for Parallel Patterns", pp. 389-402, IEEE, Jun. 24, 2017.

Turkson et al. "Artificial neural network applications in the calibration of spark-ignition engines: An overview," Engineering Science and Technology, an International Journal, vol. 19, Issue 3, Sep. 2016, 1346-1359.

U.S. Appl. No. 16/260,548 "Matrix Normal/Transpose Read and a Reconfigurable Data Processor Including Same," filed Jan. 29, 2019, 43 pages.

U.S. Appl. No. 16/407,675 " Control Flow Barrier and Reconfigurable Data Processor ," filed May 9, 2019, 32 pages.

U.S. Appl. No. 16/504,627 " Quiesce Reconfigurable Data Processor," filed Jul. 8, 2019, 78 pages.

U.S. Appl. No. 16/536,192 "Compiler Flow Logic for Reconfigurable Architectures ," filed Aug. 8, 2019, 57 pages.

U.S. Appl. No. 16/572,516 "Efficient Execution of Operation Unit Graphs on Reconfigurable Architectures Based on User Specification ," filed Sep. 16, 2019, 63 pages.

U.S. Appl. No. 16/560,057 "Sigmoid Function in Hardware and a Reconfigurable Data Processor Including Same" filed Sep. 4, 2019, 35 pages.

U.S. Appl. No. 16/572,527 "Performance Estimation-Based Resource Allocation for Reconfigurable Architectures" filed Sep. 16, 2019, 68 pages.

U.S. Appl. No. 16/590,058 "Computation Units for Functions Based on Lookup Tables" filed Oct. 1, 2019, 37 pages.

U.S. Appl. No. 16/688,069 "Look-Up Table with Input Offsetting" filed Nov. 19, 2019, 36 pages.

U.S. Appl. No. 16/695,138 "Computational Units for Batch Normalization" filed Nov. 25, 2019, 47 pages.

Intentionally Blank.

Wikipedia "bfloat16 floating-point format," downloaded Aug. 19, 2019, 2 pages.

Wikipedia "Floor and ceiling functions," downloaded Aug. 12, 2019, 5 pages.

* cited by examiner

COMPUTATIONAL UNITS FOR ELEMENT APPROXIMATION

CROSS-REFERENCE TO OTHER APPLICATION

This application is related to U.S. Nonprovisional patent application entitled "COMPUTATIONAL UNITS FOR BATCH NORMALIZATION," Ser. No. 16/695,138 filed contemporaneously. The related application is incorporated by reference for all purposes.

FIELD OF THE TECHNOLOGY DISCLOSED

The present disclosure relates to a technology for implementing a circuit to compute an approximation of an input element.

INCORPORATIONS

The following are incorporated by reference for all purposes as if fully set forth herein.

Koeplinger et al., "Spatial: A Language And Compiler For Application Accelerators," *Proceedings Of The 39th ACM SIGPLAN Conference On Programming Language Design And Implementation* (PLDI), Proceedings of the 43rd International Symposium on Computer Architecture, 2018.

Prabhakar et al., "Plasticine. A Reconfigurable Architecture for Parallel Patterns," ISCA '17, Jun. 24-28, 2017. Toronto, ON, Canada;

U.S. Nonprovisional patent application Ser. No. 16/239,252, filed Jan. 3, 2019, entitled, "VIRTUALIZATION OF A RECONFIGURABLE DATA PROCESSOR.";

U.S. Nonprovisional patent application Ser. No. 16/197,826, filed Nov. 21, 2018, entitled, "CONFIGURATION LOAD OF A RECONFIGURABLE DATA PROCESSOR,";

U.S. Nonprovisional patent application Ser. No. 16/198,086, filed Nov. 21, 2018, entitled, "CONFIGURATION UNLOAD OF A RECONFIGURABLE DATA PROCESSOR,";

U.S. Nonprovisional patent application Ser. No. 16/260,548, filed Jan. 29, 2019, entitled, "MATRIX NORMAL/TRANSPOSE READ AND A RECONFIGURABLE DATA PROCESSOR INCLUDING SAME,";

U.S. Nonprovisional patent application Ser. No. 16/536,192, filed Aug. 8, 2019, entitled, "COMPILER FLOW LOGIC FOR RECONFIGURABLE ARCHITECTURES,";

U.S. Nonprovisional patent application Ser. No. 16/407,675, filed May 9, 2019, entitled, "CONTROL FLOW BARRIER AND RECONFIGURABLE DATA PROCESSOR.";

U.S. Nonprovisional patent application Ser. No. 16/504,627, filed Jul. 8, 2019, entitled, "QUIESCE RECONFIGURABLE DATA PROCESSOR,".

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

An approximation is a mapping from a first set of elements to a reduced set of dements, herein denoted as an approximation set. For example, an approximation may map a set of reals onto a set of integers, i.e. function $A: \mathbb{R} \Rightarrow \mathbb{Z}$. Approximations are useful in a variety of machine learning applications, such as elementary function table look-up and polynomial approximations. For example, in elementary function table look-up, a look-up table may store the value $k_i = f(w_i)$ of an elementary function f for a set of discrete values $w_i$, for i=1, 2, . . . , n. In various embodiments, a circuit may provide a continuous input value x for the elementary function table look-up. The continuous input value x may not equal any of the discrete values $w_i$, for i=1, 2, . . . , n. In some embodiments, a selector circuit may receive the input value x and further compute an approximation which maps the input value x to one or more discrete values $w_j$, for j in 1, 2, . . . , n. The selector circuit may further input the selected values $w_j$ to the elementary function table look-up. For example, for each selected value $w_j$, the elementary function table look-up may return an output $k_j = f(w_j)$. Accordingly, an approximation map may be implemented by a selector circuit to associate discrete values $w_j$ with a continuous input value x for use by an elementary function table look-up.

In various embodiments, computing approximations for input values is a multi-step, computation-intensive process. In machine learning applications, approximations may be computed on matrices with large numbers of elements leading to increased computational loads, large power consumption, and extended computation times. For example, an approximation algorithm may compute a distance between the input value x and multiple values $w_i$ in an approximation set W. The algorithm may return a $w_i$ with the smallest distance value from input x as the computed approximation.

Current methods for computing approximations implement algorithms that compute distances between each input element x and multiple elements of an approximation set W. However, one drawback of computing multiple distances is that computational latency may be increased. For example, computing a distance value between an input x and an element $w_i$ of the approximation set w may utilize a clock cycle. Accordingly, computing the distance for each element of the approximation set W may consume multiple clock cycles, thereby leading to increased computational latency for large approximation sets. Furthermore, performing these high-latency computations over large matrices may result in extensive computational loads.

One proposed solution to reducing computational latency and computational loads may be to compute distance values over a reduced number of elements of an approximation set W. For example, for each input x, distance values may only be computed using a limited number of $w_i$ in the approximation set W. However, limiting the number of $w_i$ evaluated in the approximation process may produce low-accuracy approximations with high error rates and limited usability.

Accordingly, ways to reduce computational latency and load in performing approximations, while preserving accuracy may be desirable.

SUMMARY

The present technology provides a technique for performing low-computational latency approximations while preserving accuracy. In some embodiments, the technique may be embodied by an integrated circuit configured to execute a sequence of operations on a set of input elements to compute an approximation. For example, the technique may include shifting an input element from a primary range to a shifted range. The technique may also include modifying the data format of the input element in the shifted range. In various embodiments, modifying the data format in the shifted range may produce an approximation. The technique further shifts the approximation from the shifted range to the primary range. In various embodiments, computing the approximation in the shifted range may reduce computational load, while preserving approximation accuracy. Accordingly, the disclosed technique utilizes multiple ranges and data formats to reduce computational latency in computing approximations, while preserving approximation accuracy. Various embodiments of the present disclosure provide under-approximations (e.g., floor approximations) and over-approximations (e.g., ceiling approximations) of input elements in various data formats. Example applications of this technique include re-configurable data processors, systems utilizing floating-point encodings, and so forth.

In this way, a computation unit of the present disclosure achieves an improvement over conventional approximation hardware by utilizing a multi-format approach that reduces computational latency and computational load, while preserving accuracy.

In various embodiments, methods, as described herein, may be applied in data processing systems to execute a multi-format approximation technique.

Re-configurable processors, as described herein, may include an array of configurable units that may be configured to implement a multi-format approximation technique.

Other aspects and advantages of the present disclosure can be seen on review of the drawings, the detailed description and the claims, which follow.

DETAILED DESCRIPTION

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows.

Figure 1A:
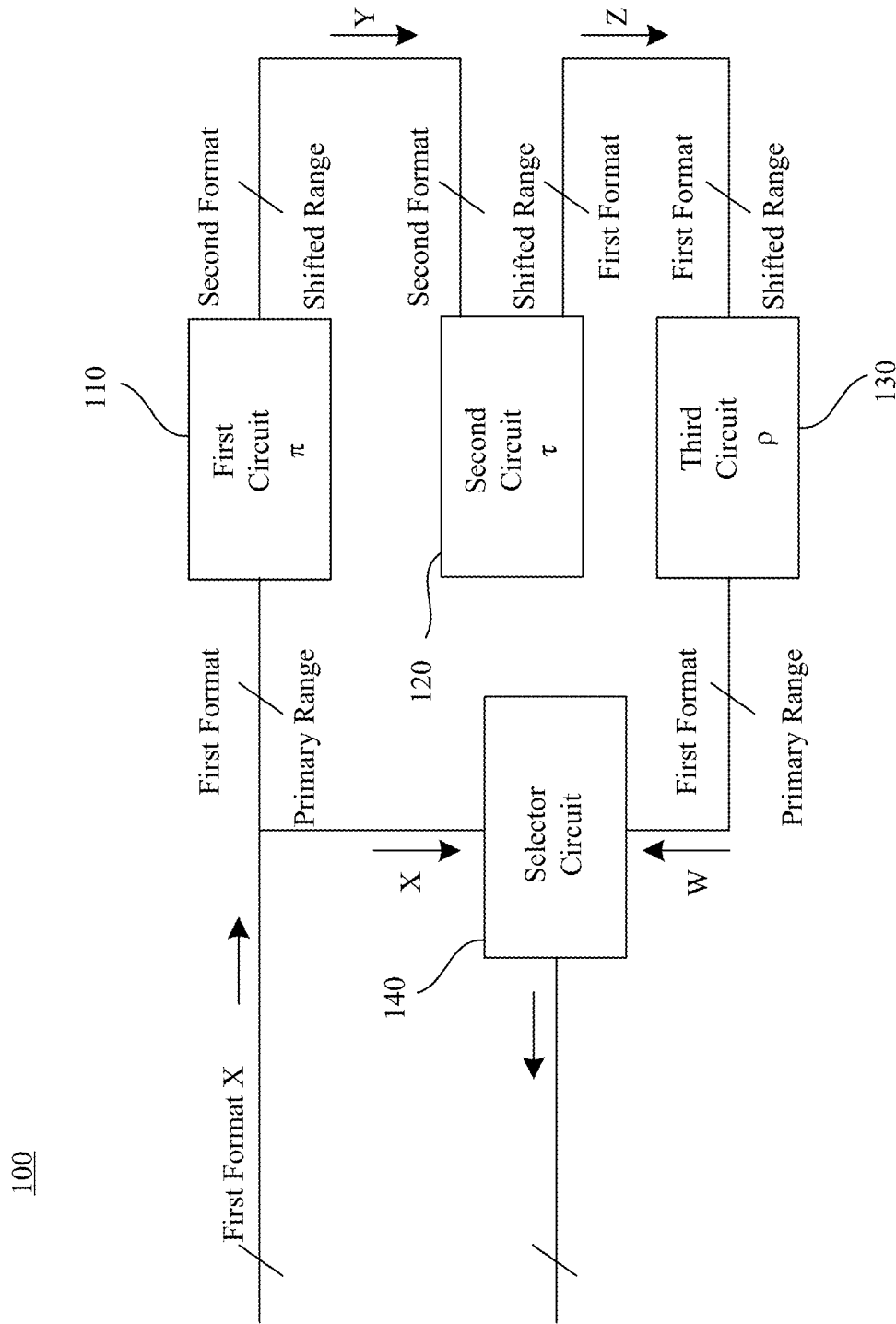
FIG. 1A is a schematic diagram illustrating a circuit for computing an approximation of an input element, according to various embodiments.

FIG. 1A is a schematic diagram illustrating an integrated circuit 100 for computing an approximation of an input element, according to various embodiments. In various embodiments, an integrated circuit 100 may include a first circuit 110, a second circuit 120, and a third circuit 130 for computing approximations from input elements X. In various embodiments, an input element $x_i$ may be represented by a first format. For example, and not by way of limitation, a first format may include a 16-bit Bfloat format (BF16), a 32-bit floating-point format (FP32), a 64-bit floating-point format (FP64), and so forth.

In various embodiments, the integrated circuit 100 may compute a ceiling value $w_i$ for an input element $x_i$. For example, and not by way of limitation, a first circuit 110 may receive an input element $x_i$ and further select a shift value S based on the received input element. For example, in some embodiments, the first circuit 110 may select a larger shift value for $x_i$ greater than zero and a smaller shift value for $x_i$ equal to or less than zero. The first circuit 110 may further shift the input element $x_i$ by the shift value S. For example, the first circuit 110 may compute a difference $y_i=(x_i-S)$. In so doing, the first circuit 110 may shift the value of an input element $x_i$ from a primary region (e.g., (-R, R) or ($-2^7$, $2^7$)) to a shifted range (e.g., (-D, -D+R) or ($-2^7$, $-2^7$)). In addition, computing the difference $y_i$ may modify the format of the input element $x_i$. For example, the input element $x_i$ may be represented by a first data format, while the difference $y_i$ may be represented by a second format. In various embodiments, the second format may be a higher-precision representation of an input element relative to the first format. In further embodiments, the first circuit 110 may output the difference $y_i$ to a second circuit 120.

In further embodiments, a second circuit 120 may receive the difference $y_i$ and further compute an approximation of the difference. For example, and not by way of limitation, the second circuit 120 may truncate one or more bits from the difference $y_i$ in the second format to convert $y_i$ to the first format, thereby rounding the difference $y_i$. Herein, the rounded difference is denoted $z_i$. In operation, the second circuit 120 in truncating the difference $y_i$ may decrease the magnitude (i.e., absolute value) of the difference $y_i$, thereby rounding a positive number downwards towards zero and rounding a negative number upwards towards zero. In various embodiments, the rounded difference $z_i$ may be located in the shifted range. In additional embodiments, the second circuit 120 may output the rounded difference $z_i$ to a third circuit 130.

In further embodiments, a third circuit 130 may receive the rounded difference $z_i$ and further shift the rounded difference $z_i$ from the shifted range to the primary range. For example, the third circuit 130 may compute the sum of the rounded difference $z_i$ and the shifted value S, thereby producing $w_i$, the rounded value of $x_i$ in the primary range. In various embodiments, the third circuit 130 may output the rounded value $w_i$ to a selector circuit 140.

In various embodiments, the selector circuit 140 may compare the rounded value $w_i$ with the input element $x_i$. The selector circuit 140 may further select an output element from the rounded value $w_i$ and the input element $x_i$ to output for subsequent computations. For example, the selector circuit 140 may compute an absolute value of an input element $x_i$. In addition, the selector circuit 140 may determine if the absolute value of the input element $x_i$ is within a bound. For example, the selector circuit 140 may determine if the absolute value of the input element $x_i$ is within the primary range. If the absolute value of the input element $x_i$ is within the primary range, then the selector circuit may output the rounded value $w_i$ for subsequent computations. However, if the absolute value of the input element $x_i$ is not within the primary range, then the selector circuit 140 may output the input element $x_i$ for subsequent computations.

In this way, the integrated circuit 100 may compute a ceiling value of $x_i$ from the input element $x_i$ by shifting the value of an input element to a shifted range producing a second format, rounding the input elements in the shifted range by truncating one or more bits from the second format to reproduce the first format, and returning the rounded elements back to a primary range. In operation, the integrated circuit 100 may compute a ceiling value for $x_i$ by truncating the shifted value of $x_i$ in the shifted range, reducing computation load, while preserving computational accuracy.

In further embodiments, the integrated circuit 100 may compute a floor value $w_i$ for an input element $x_i$. For example, and not by way of limitation, a first circuit 110 may receive an input element $x_i$ and further select a shift value S based on the received input element. For example, in some embodiments, the first circuit 110 may select a smaller shift value for $x_i$ greater than zero and a larger shift value for $x_i$ equal to or less than zero. The first circuit 110 may further shift the input element $x_i$ by the shift value S. For example, the first circuit 110 may compute a sum $y_i = (x_i + S)$. In so doing, the first circuit 110 may shift the value of an input element $x_i$ from a primary region (e.g., $(-R, R)$ or $(-2^7, 2^7)$) to a shifted range (e.g., $(D-R, D)$ or $(2^7, 2^8)$). In addition, computing the sum $y_i$ may modify the format of the input element $x_i$. For example, the input element $x_i$ may be represented by a first data format, while the sum $y_i$ may be represented by a second format. In various embodiments, the second format may be a higher-precision representation of an input element relative to the first format. In further embodiments, the first circuit 110 may output the sum $y_i$ to a second circuit 120.

In further embodiments, a second circuit 120 may receive the sum $y_i$ and further compute an approximation of the sum. For example, and not by way of limitation, the second circuit 120 may truncate one or more bits from the sum $y_i$ in the second format to convert $y_i$ to the first format, thereby rounding the sum $y_i$. Herein, the rounded sum is denoted $z_i$. In operation, the second circuit 120 in truncating the sum $y_i$ may decrease the magnitude (i.e., absolute value) of the sum $y_i$, thereby rounding a positive number downwards towards zero and rounding a negative number upwards towards zero. In various embodiments, the rounded sum $z_i$ may be located in the shifted range. In additional embodiments, the second circuit 120 may output the rounded sum $z_i$ to a third circuit 130.

In further embodiments, a third circuit 130 may receive the rounded sum $z_i$ and further shift the rounded sum $z_i$ from the shifted range to the primary range. For example, the third circuit 130 may compute the difference of the rounded sum $z_i$ and the shifted value S, thereby producing $w_i$, the rounded value of $x_i$ in the primary range. In various embodiments, the third circuit 130 may output the rounded value $w_i$ to a selector circuit 140.

In various embodiments, the selector circuit 140 may compare the rounded value $w_i$ with the input element $x_i$. The selector circuit 140 may further select an output element from the rounded value $w_i$ and the input element $x_i$ to output for subsequent computations. For example, the selector circuit 140 may compute an absolute value of an input element $x_i$. In addition, the selector circuit 140 may determine if the absolute value of the input element $x_i$ is within a bound. For example, the selector circuit 140 may determine if the absolute value of the input element $x_i$ is within the primary range. If the absolute value of the input element $x_i$ is within the primary range, then the selector circuit may output the rounded value $w_i$ for subsequent computations. However, if the absolute value of the input element $x_i$ is not within the primary range, then the selector circuit 140 may output the input element $x_i$ for subsequent computations.

In this way, the integrated circuit 100 may compute a floor value of $x_i$ from the input element $x_i$ by shifting the value of an input element to a shifted range producing a second format, rounding the input elements in the shifted range by truncating one or more bits from the second format to reproduce the first format, and returning the rounded elements back to a primary range. In operation, the integrated circuit 100 may compute a ceiling value for $x_i$ by truncating the shifted value of $x_i$ in the shifted range, reducing computation load, while preserving computational accuracy.

Figure 1B:
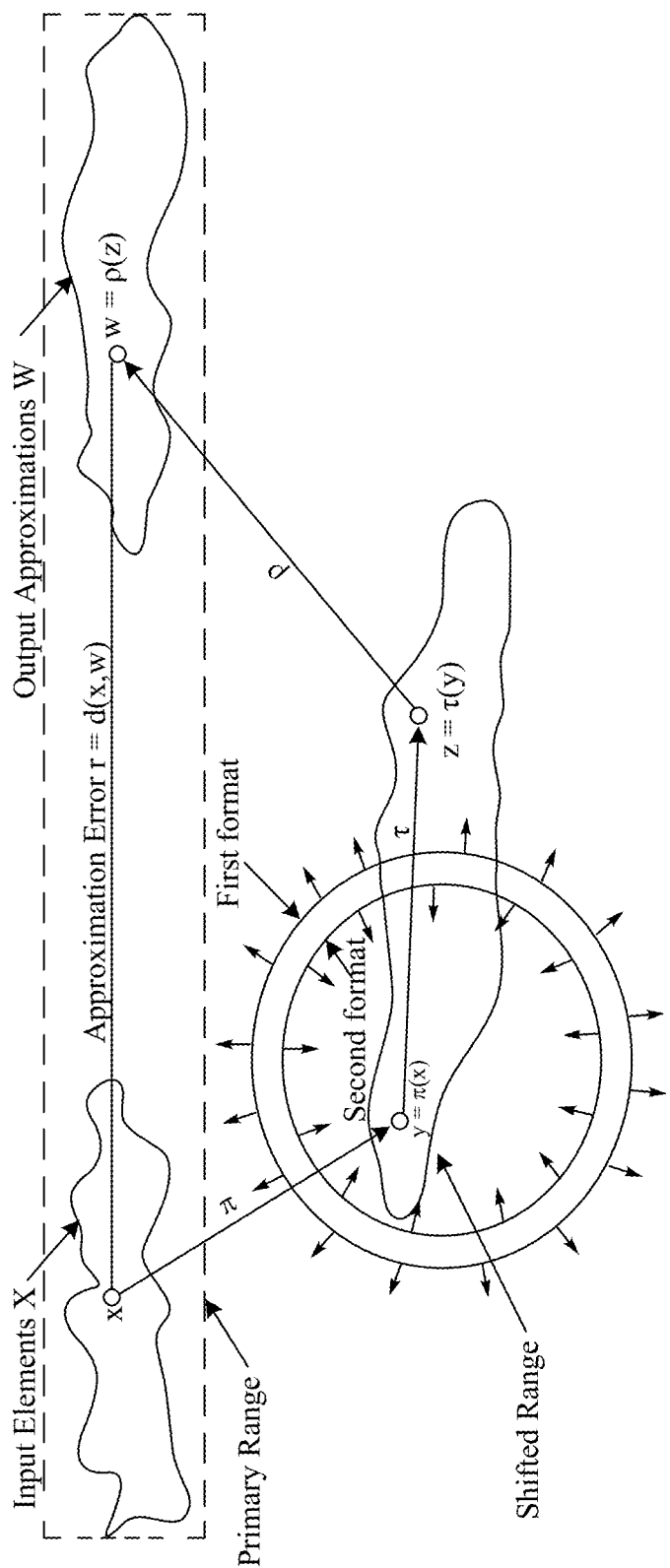
FIG. 1B is a functional mapping of the integrated circuit of FIG. 1A performing one or more computational steps in computing an approximation, according to various embodiments.

FIG. 1B is a functional mapping of the integrated circuit 100 performing one or more computational steps in computing an approximation, according to various embodiments. In operation, a first circuit 110 may receive one or more input elements X. The input elements X may be co-located in a primary range. For example, and not by way of limitation, a primary range may be a region, a set of elements, a group of numbers, set of real numbers, a set of irrational numbers, a set of complex numbers, a set of vectors, a set of tensors, etc. For example, and not by way of limitation, the primary range may correspond to, include, be described by, and/or be included in a span of the first format.

For instance, the first format may be a BF16 format. In one implementation, the range of the BF16 format is $(-2^8, -2^7)$ for the ceiling function. In another implementation, the range of the BF16 format is $(2^7, 2^8)$ for the floor function.

In various embodiments, the first circuit 100 may include a projection operator $\pi$. For example, and not by way of limitation, the first circuit 110 may apply a projection operator π to the input element to produce an output y. In various embodiments, the projection operator π may compute a projection of the input element from the primary range onto a shifted range. For example, and not by way of limitation, the projection operator π may add a shift value to an input element $x_i$, may subtract a shift value from an input element $x_i$, may multiply an input element $x_i$ by a shift factor, may divide an input element $x_i$ by a shift factor, and/or may perform one or more operations on an input element $x_i$ to compute a projection of the input element $x_i$ from the primary range to a shifted range.

In further embodiments, the projection operator π may map an input element $x_i$ in the primary range to an output element $y_i$ in the shifted range. For example, the projection operator π may perform an addition operation and/or a subtraction operation by a shift value S to project the input element $x_i$ from a primary range onto a shifted range. The projection operator π may select a shift value (e.g., a fixed shift value, a variable shift value, etc.) based a type of approximation being performed by the integrated circuit 100. For example, and not by way of limitation, the integrated circuit 100 may compute a floor approximation for one or more input elements X. Accordingly, the projection operator π may implement a shift value S that projects the input element $x_i$ to a positive shift region. Additionally, or alternatively, the integrated circuit 100 may compute a ceiling approximation for one or more input elements. Accordingly, the projection operator π may implement a shift value S that projects the input element $x_i$ to a negative shift region. These specific examples are non-limiting as any projection of an input element from a primary region to a shifted region to perform an approximation is within the scope of the present disclosure.

In various embodiments, the shifted range may include a portion of the primary range and/or may be disjoint from the primary range. For example, and not by way of limitation, the shifted range may include one or more of a set of elements, a set of numbers, a set of real numbers, a set of irrational numbers, a set of complex numbers, a set of vectors, a set of tensors, etc. In further embodiments, the shifted range may include one or more boundary regions of the primary range and/or the first format. For example, if the first format represents numbers in a region (−D, D), then for some R less than D, the primary range may be (−R, R) and the shifted range may be a union of (−D+R, R) and (R, D−R). In various embodiments, R may be chosen based on one or more parameters of the first format, such as, e.g., a value corresponding to a register of the first format, such as a largest register, a largest exponent register, a largest mantissa register, a next largest register, a next largest exponent register, a next largest mantissa register, a smallest register, a smallest exponent register, a smallest mantissa register, a next smallest register, a next smallest exponent register, a next smallest mantissa register, and so forth. For example, and not by way of limitation, a first format may be the BF16 format. In various embodiments, the BF16 format may represent numbers in a range (e.g., $(-2^8, -2^7)$ for the ceiling function and $(2^7, 2^8)$ for floor function). Accordingly, D may be selected as $2^8$, and R may be selected as a value corresponding to a largest register of the exponent of the BF16 format, e.g., $2^7$. Accordingly, in one implementation, a primary range may be $(-2^7, 2^7)$ and a shifted range may be one or more of $(-2^8, -2^7)$ and $(2^7, 2^8)$.

In further embodiments, the projection operator π may produce an output $y_i$ in the shifted region with a second format. The second format may be different than the first format. For example, and not by way of limitation, the second format may include one or more bits relative to the first format, may represent outputs using a different arrangement of bits relative to the first format, may represent outputs using bit registers of different values and/or powers that the first format, may represent outputs using a different data storage protocol relative to the first format, may represent outputs using a non-bit storage protocol, and so forth. For example, and not by way of limitation, the second data format may have a larger span than the first format, may represent elements with greater precision than the first format, may compress and/or expand one or more sets of bits from the first format, may shift one or more bits of the first format, and so forth. In some embodiments, some or all of sticky bits, hidden bits, mantissa bits, exponent bits, guard bits, round bits, etc., from the first format may be utilized in generating the output $y_i$ in the second format. In some embodiments, a bit length of the output $y_i$ in the second format may include one or more bits relative to the bit length of the input element $x_i$ in the first format.

In various embodiments, a second circuit 120 may receive the output $y_i$ of the first circuit 110 as an input, where $y_i$ may be an element of the shifted range and be represented in the second format. The second circuit 120 may implement a transformation operator τ for converting input $y_i$ from the second format to the first format in the shifted range. In various embodiments, the transformation operator τ may be a map from the shifted range back onto the shifted range. In operation, the transformation operator may map input elements in a second format in the shifted range to output elements in a first format in the shifted range. For example, and not by way of limitation, the transformation operator τ may truncate one or more bits from the second format, may compress the second format, may rearrange one or more sets of bits the second format, may convert the second format from a non-bit data format to the first format, may shift one or more bits of the second format, may reduce the precision of the second format, may generate a reduced-memory representation of the second data format, and so forth. For example, and not by way of limitation, the transformation operator τ may generate an approximation $z_i$ in the first format of the input $y_i$ in the second format by truncating one or more bits from a mantissa of the input $y_i$. Additionally, or alternatively, the transformation operator τ may produce an approximation by rearranging a pair of bits in the second format to convert the second format to the first format. In various embodiments, the second circuit 120 may output an approximation $z_i$ in the first format to third circuit 130, where $z_i$ is an element of the shifted range.

In various embodiments, a third circuit 130 may receive an approximation $z_i$ in the shifted range as an input. The third circuit 130 may further generate an output $w_i$ corresponding to the input $z_i$. For instance, in some embodiments, the third circuit 130 may include a projection operator ρ. In operation, the projection operator ρ may map inputs from the shifted range to the primary range. For example, the projection operator ρ may map an input approximation $z_i$ in the shifted range to an output approximation $w_i$ in the primary range. For instance, and not by way of limitation, if a projection operator π performs a first operation (e.g., a subtraction operation) to project an input element $x_i$ from a primary range to a shifted range to produce a projection $y_i$, then the projection operator ρ may perform an inverse operation (e.g., an addition operation) to project an approximation $z_i$ of the projection $y_i$ from the shifted range to the primary range. Additionally, or alternatively, the projection operator ρ may perform one or more other operations include, for example, and by way of limitation, an addition operation by a shift value to an approximation $z_i$, a subtraction operation by a shift value to an approximation $z_i$, a multiplication operation by a shift factor to an approximation $z_i$, a division operation to an approximation $z_i$ by a shift factor, and/or may one or more operations to an approximation $z_i$, such as an inverse operation, computing a power of the approximation $z_i$, and so forth. Accordingly, the projection operator ρ may project an approximation $z_i$ from the shifted range to the primary range to generate an output $w_i$.

In various embodiments, an output $w_i$ in the primary range may be an approximation of input element $x_i$. In various embodiments, a metric d may be implemented to measure a distance r between output $w_i$ and input element $x_i$, e.g., a Euclidean distance computed as d $(w_i, x_i)=|x_i-w_i|$. In operation, the distance r may define an approximation error generated by the integrated circuit 100 in computing an approximation $w_i$ of input element $x_i$. In various embodiments, the integrated circuit 100 may reduce an approximation error r by computing the approximation $z_i$ in the shifted range. For example, the first circuit 110 may implement the projection operator π to convert the input element $x_i$ from a first format to a second format. In various embodiments, the second format may be a higher-precision representation of the projected input $x_i$ in the shifted range. Furthermore, utilizing the second format in the shifted range for computing an approximation may improve computational accuracy. In addition, the second circuit 120 may implement a transformation operator τ in the shifted region to generate an approximation $z_i$ in the first format. In various embodiments, the transformation operator τ may perform an approximation by truncating one or more bits from the second format. Truncating bits may be a low-computational load process with limited computational latency. Accordingly, the integrated circuit 100 may implement an approximation technique that preserves accuracy while reducing computation load and computational latency.

In various embodiments, the integrated circuit 100 may further include a selector circuit 140. In various embodiments, the selector circuit 140 perform one or more additional computational steps before outputting the approximation $w_i$. For example, and not by way of limitation, the selector circuit 140 may compute the absolute value and/or a magnitude of the input $x_i$. For instance, the selector circuit 140 may compute a magnitude C=d $(x_i, x_i)$. In the case of a Euclidean metric, d, a magnitude C=d $(x_i, x_i)=\Sigma_{j=0}^{m} x_{ij}^2$, where m may be a dimensionality of the primary range. In further embodiments, the selector circuit 140 may compare the magnitude C to a bound. For example, and not by way of limitation, the bound may correspond to a boundary of the primary range. In some embodiments, if the primary range is designated as (−R, R), then the bound may be selected as R. Accordingly, the selector circuit 140 may compare the magnitude C to the boundary of the primary range R. In some embodiments, if the magnitude C is less than boundary R, then the selector circuit 140 may output the approximation value $w_i$ for subsequent computations. However, if the magnitude C is greater than the boundary R, then the selector circuit 140 may output the input element $x_i$ for subsequent computations. Accordingly, the selector circuit 140 may preserve accuracy by outputting approximation values $w_i$ for input element $x_i$ with magnitudes that fall within the boundary R, while outputting input values $x_i$ if the magnitude C corresponding to the $x_i$ fall outside of the boundary R.

Figure 2:
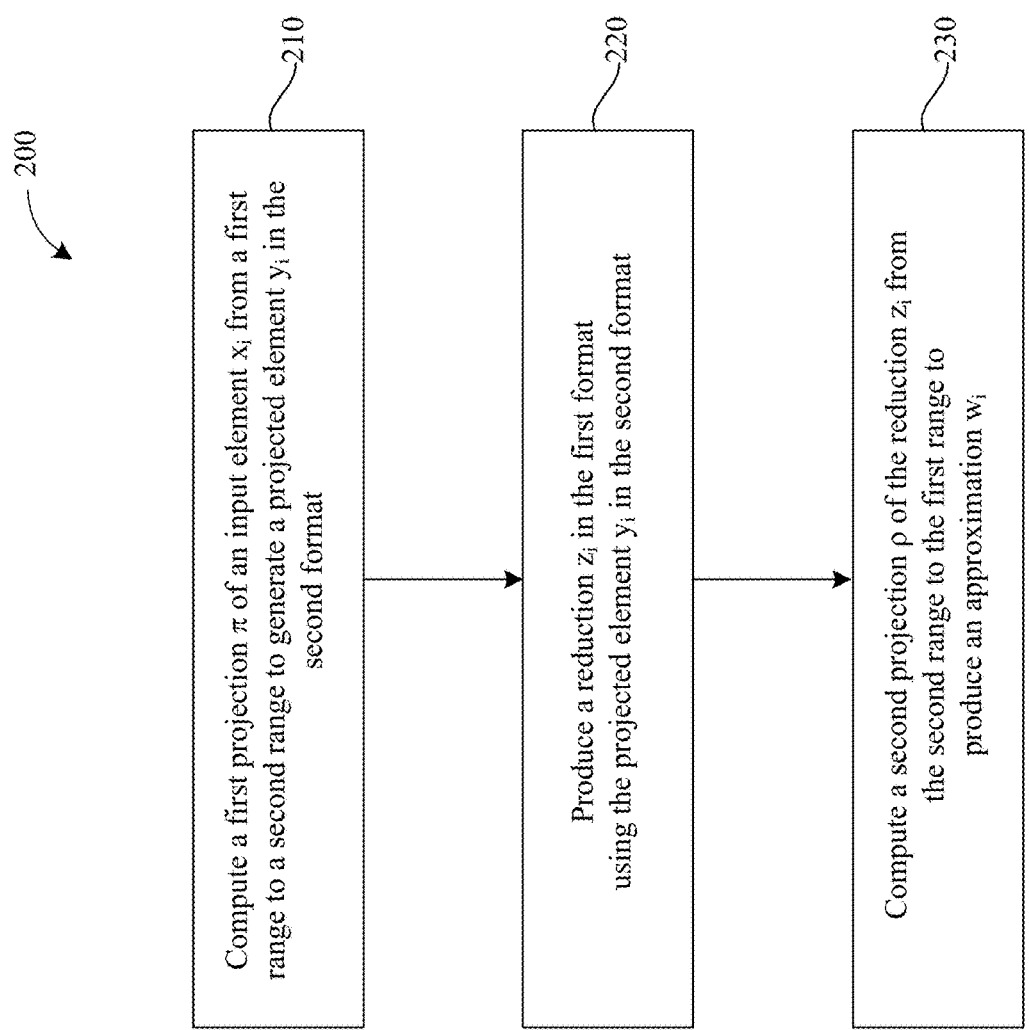
FIG. 2 is a flowchart of method steps for computing an approximation, according to various embodiments.

FIG. 2 is a flowchart illustrating a method for computing approximations, according to various embodiments. Accordingly, in the flowchart 200, at Step 210, the first circuit 110 may compute a first projection π of an input element $x_i$ from a first range to a second range to generate a projected element $y_i$. In various embodiments, the input element $x_i$ may be in a first format. The projection π may produce a second format by shifting one or more bits of the input element $x_i$ to generate the projected element $y_i$ in the shifted range.

At step 220, a second circuit 120 may produce a reduction $z_i$ in the first format using the projected element $y_i$ in the second format. For example, and not by way of limitation, the second circuit 120 may truncate one or more bits from the projected element $y_i$ to compute the reduction $z_i$ in the first format from the projected element $y_i$ in the second format. In various embodiments, the second circuit 120 may operate in the shifted range, thereby enhancing computational accuracy, while reducing computational loads and/or computational latency.

At Step 230, the third circuit 130 may compute a second projection ρ of the reduction $z_i$ from the second range to the first range to produce the approximation $w_i$. In some embodiments, the second projection ρ may be an inverse of the first projection π. For example, if the first projection π adds a shift value S to an input element $x_i$, then the second projection ρ may subtract from a corresponding reduction $z_i$ the shift value S. In further embodiments, the third circuit 130 may compute an approximation error r=d$(x_i, w_i)$, where d may be a metric on the primary range.

In further embodiments, a selector circuit 140 may compare the approximation $w_i$ and the input element $x_i$ and select one of the approximation $w_i$ and the input element $x_i$ for output. For example, the selector circuit 140 may compute a magnitude C of the input element $x_i$. If the magnitude C is greater than a boundary R of the primary range, then the selector circuit 140 may select the input element $x_i$ for output. However, if the magnitude C of the input element $x_i$ is less than the boundary R of the primary range, then the selector circuit 140 may select the approximation $w_i$ for output. In this way, the integrated circuit 100 may produce approximations $w_i$ with low computational latency and low computational load, while preserving approximation accuracy across large batches of input elements X.

Figure 3:
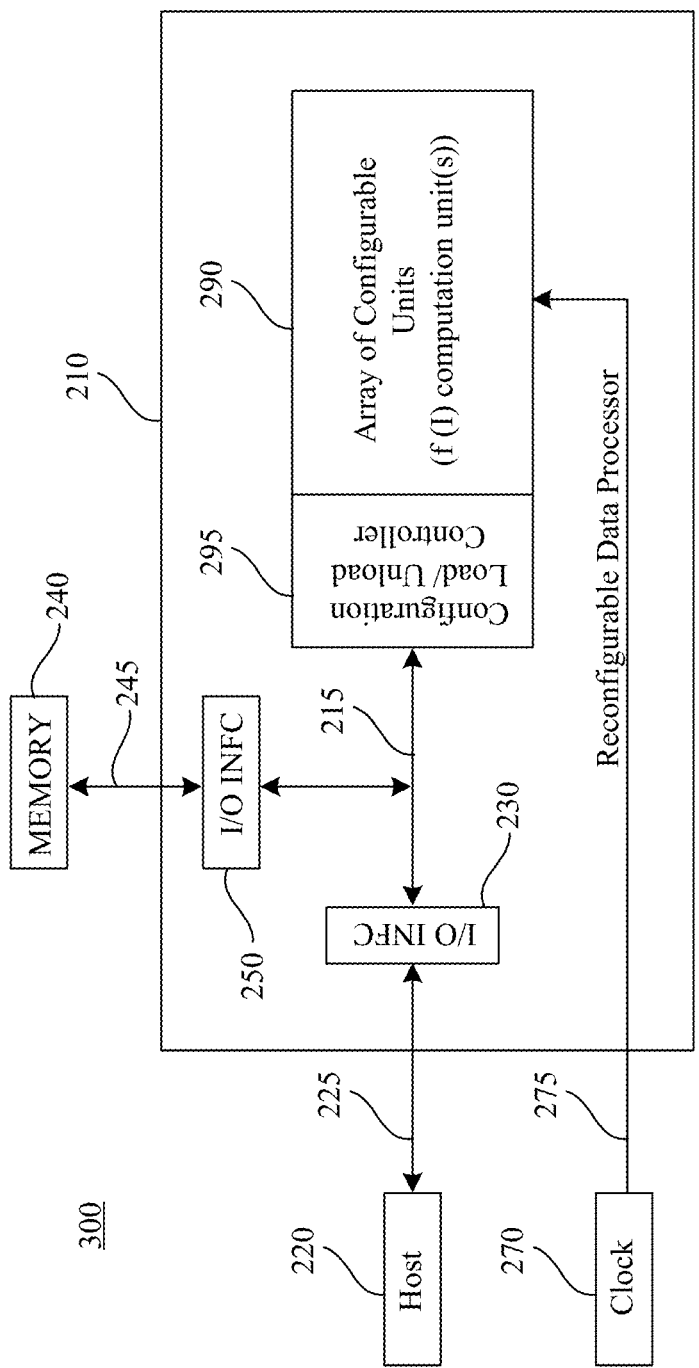
FIG. 3 is a simplified block diagram of a top level network and components of a CGRA (Coarse Grain Reconfigurable Architecture), according to various embodiments.

FIG. 3 is a diagram illustrating a system 300 including a host 220, a memory 240, and a reconfigurable data processor 210 in which a computation unit as described herein is deployed. As shown in the example of FIG. 3, the reconfigurable data processor 210 includes an array 290 of configurable units and a configuration load/unload controller 295.

Figure 6:
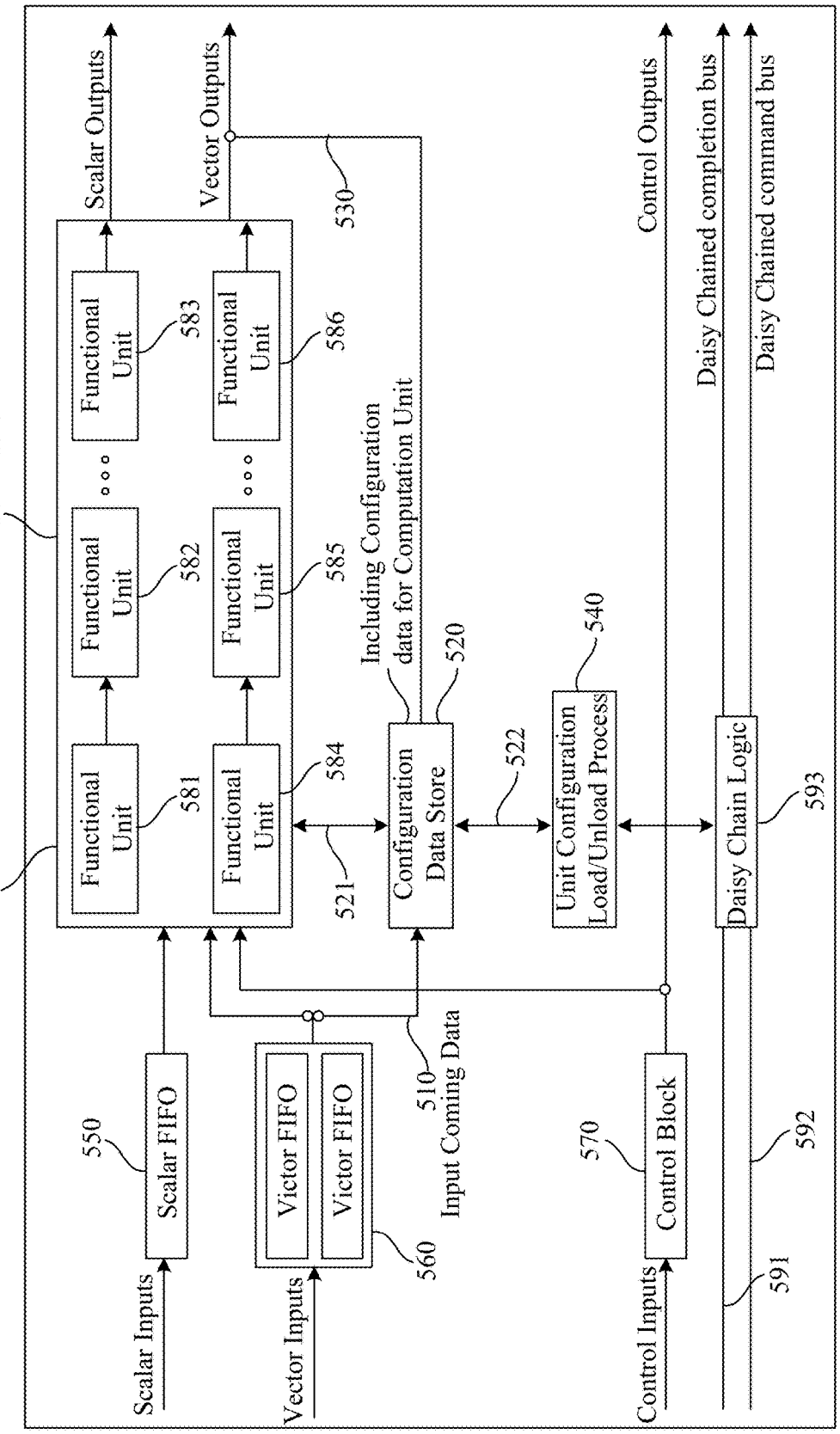
FIG. 6 is a block diagram illustrating an example configurable unit, such as a Pattern Compute Unit (PCU), according to various embodiments.
Figure 7:
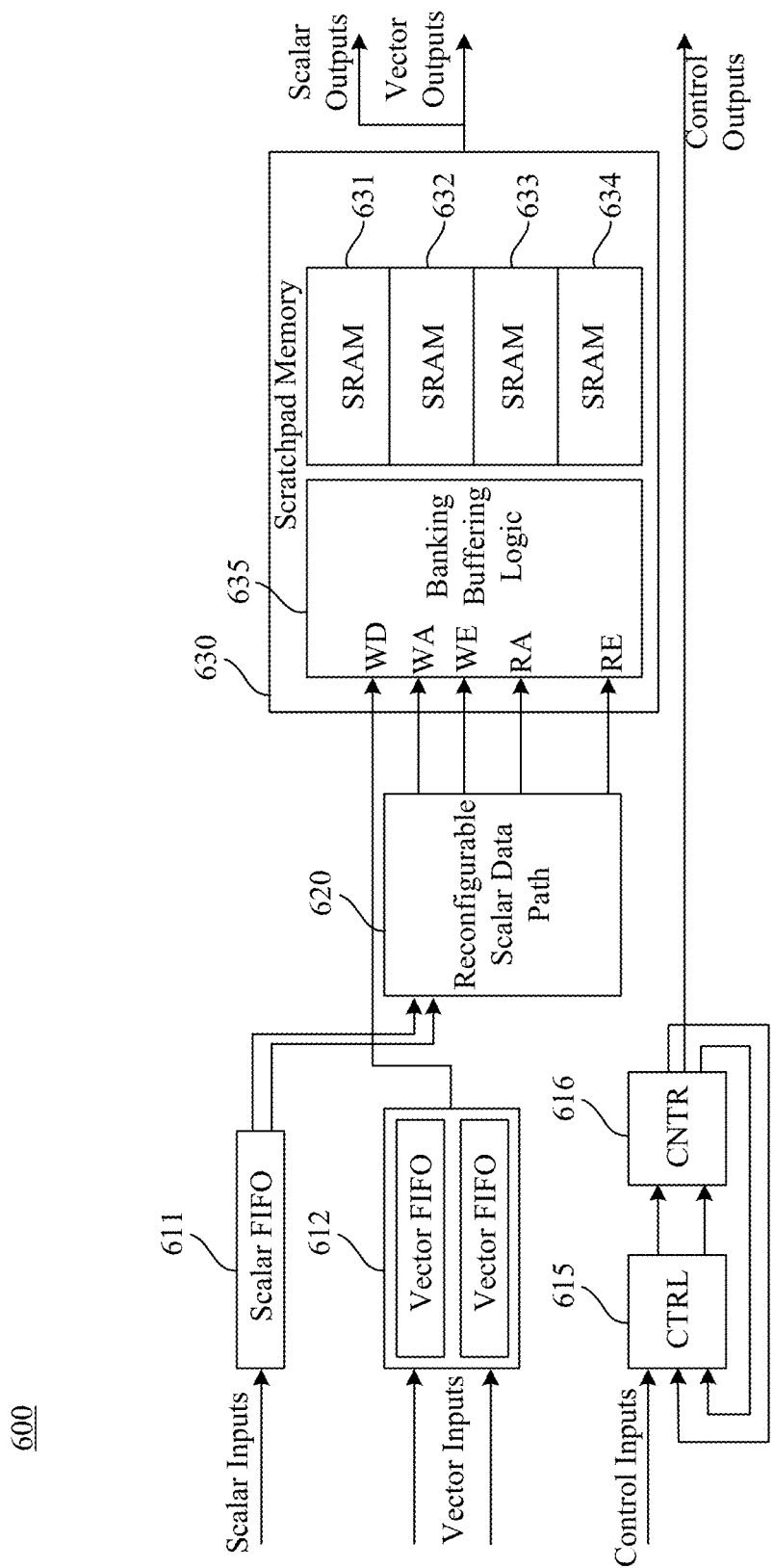
FIG. 7 is a block diagram illustrating an example configurable unit, such as a Pattern Memory Unit (PMU), according to various embodiments.

Configurable units in an array 290 of configurable units are further described in reference to FIGS. 6 and 7. Configurable units can include, or can have units configured to implement, a computation unit or computation units, as described herein.

The processor 210 includes an external I/O interface 230 connected to the host 220 by line 225, and an external I/O interface 250 connected to the memory 240 by line 245. The I/O interfaces 230, 250 connect via a bus system 215 to the array 290 of configurable units and to the configuration load/unload controller 295. The bus system 215 may have a bus width of carrying one chunk of data, which can be for this example 128 bits (references to 128 bits throughout can be considered as an example chunk size more generally).

To configure configurable units in the array 290 of configurable units with a configuration file, the host 220 can send the configuration file to the memory 240 via the interface 230, the bus system 215, and the interface 250 in the reconfigurable data processor 210. The configuration file can be loaded in many ways, as suits a particular architecture, including in data paths outside the configurable processor 210. The configuration file can be retrieved from the memory 240 via the memory interface 250. Chunks of the configuration file can then be sent in a distribution sequence to configurable units in the array 290 of configurable units in the reconfigurable data processor 210.

An external clock generator 270 or other clock line sources can provide a clock line 275 or clock lines to elements in the reconfigurable data processor 210, including the array 290 of configurable units, and the bus system 215, and the external data I/O interfaces. The bus system 215 can communicate data at a processor clock rate via a clock line 275 or clock lines.

Figure 4:
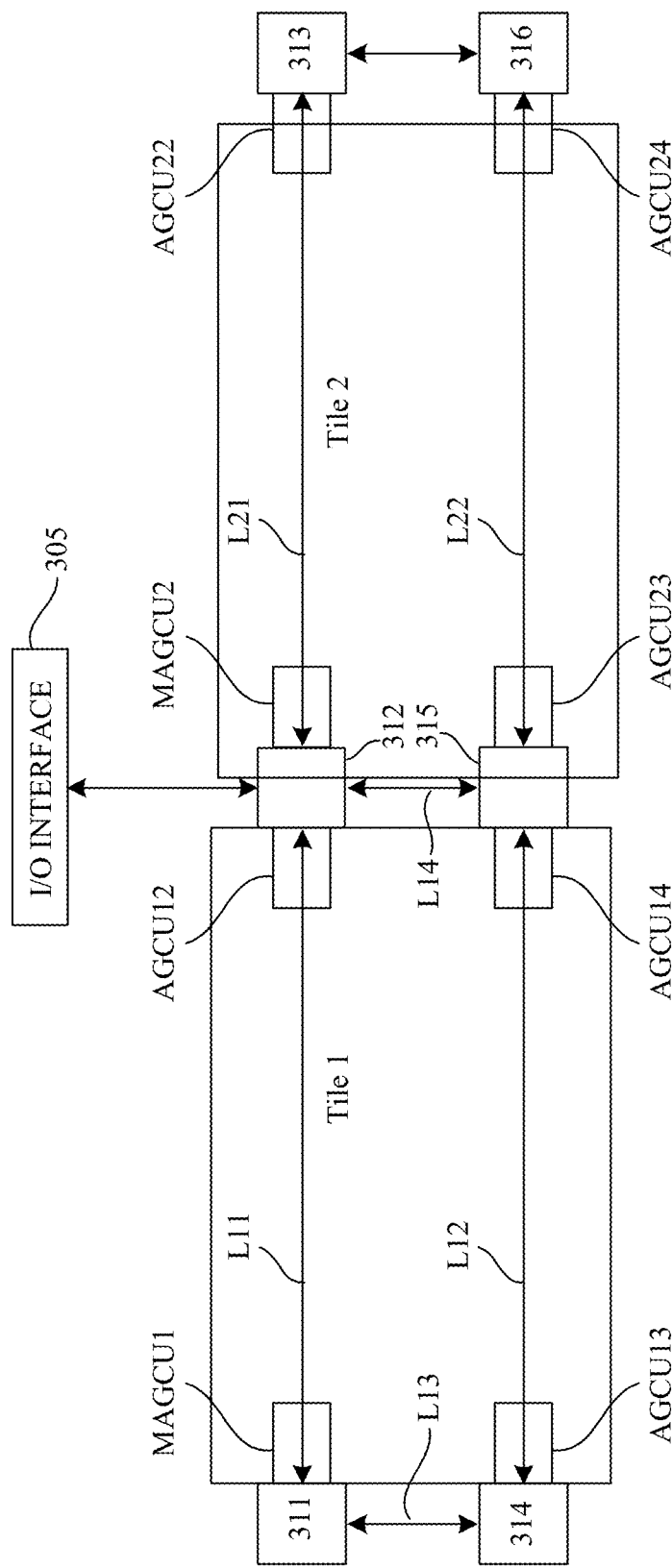
FIG. 4 is a simplified diagram of a tile and an array level network usable in the configuration of FIG. 3, according to various embodiments.

FIG. 4 is a simplified block diagram of components of a CGRA (Coarse Grain Reconfigurable Architecture) processor. In this example, the CGRA processor has 2 tiles (Tile1, Tile2). The tile comprises an array of configurable units connected to a bus system, including array level networks in this example. An array of configurable units (e.g. 290, FIG. 2) in the tile includes a lookup table with a sub-table. The bus system includes a top level network connecting the tiles to external I/O interface 305 (or any number of interfaces). In other embodiments, different bus system configurations may be utilized. The configurable units in each tile are nodes on the array level network in this embodiment.

Each of the tiles has 4 AGCUs (Address Generation and Coalescing Units) (e.g. MAGCU1, AGCU12, AGCU13, AGCU14). The AGCUs are nodes on the top level network and nodes on the array level networks, and include resources for routing data among nodes on the top level network and nodes on the array level network in each tile.

Nodes on the top level network in this example include one or more external I/Os, including interface 305. The interfaces to external devices include resources for routing data among nodes on the top level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top level network and the array level network or networks.

The top level network is constructed using top level switches (311-316) connecting to each other as well as to other nodes on the top level network, including the AGCUs, and I/O interface 305. The top level network includes links (e.g. L11, L12, L21, L22) connecting the top level switches. Data travel in packets between the top level switches on the links, and from the switches to the nodes on the network connected to the switches. For example, top level switches 311 and 312 are connected by a link L11, top level switches 314 and 315 are connected by a link L12, top level switches 311 and 314 are connected by a link L13, and top level switches 312 and 313 are connected by a link L21. The links can include one or more buses and supporting control lines, including for example a chunk-wide bus (vector bus). For example, the top level network can include data, request and response channels operable in coordination for transfer of data in a manner analogous to an AXI compatible protocol. See, AMBA® AXI and ACE Protocol Specification, ARM, 2017.

Top level switches can be connected to AGCUs. For example, top level switches 311, 312, 314 and 315 are connected to MAGCU1, AGCU12, AGCU13 and AGCU14 in the tile Tile1, respectively. Top level switches 312, 313, 315 and 316 are connected to MAGCU2, AGCU22, AGCU23 and AGCU24 in the tile Tile2, respectively.

Top level switches can be connected to one or more external I/O interfaces (e.g. interface 305).

Figure 5:
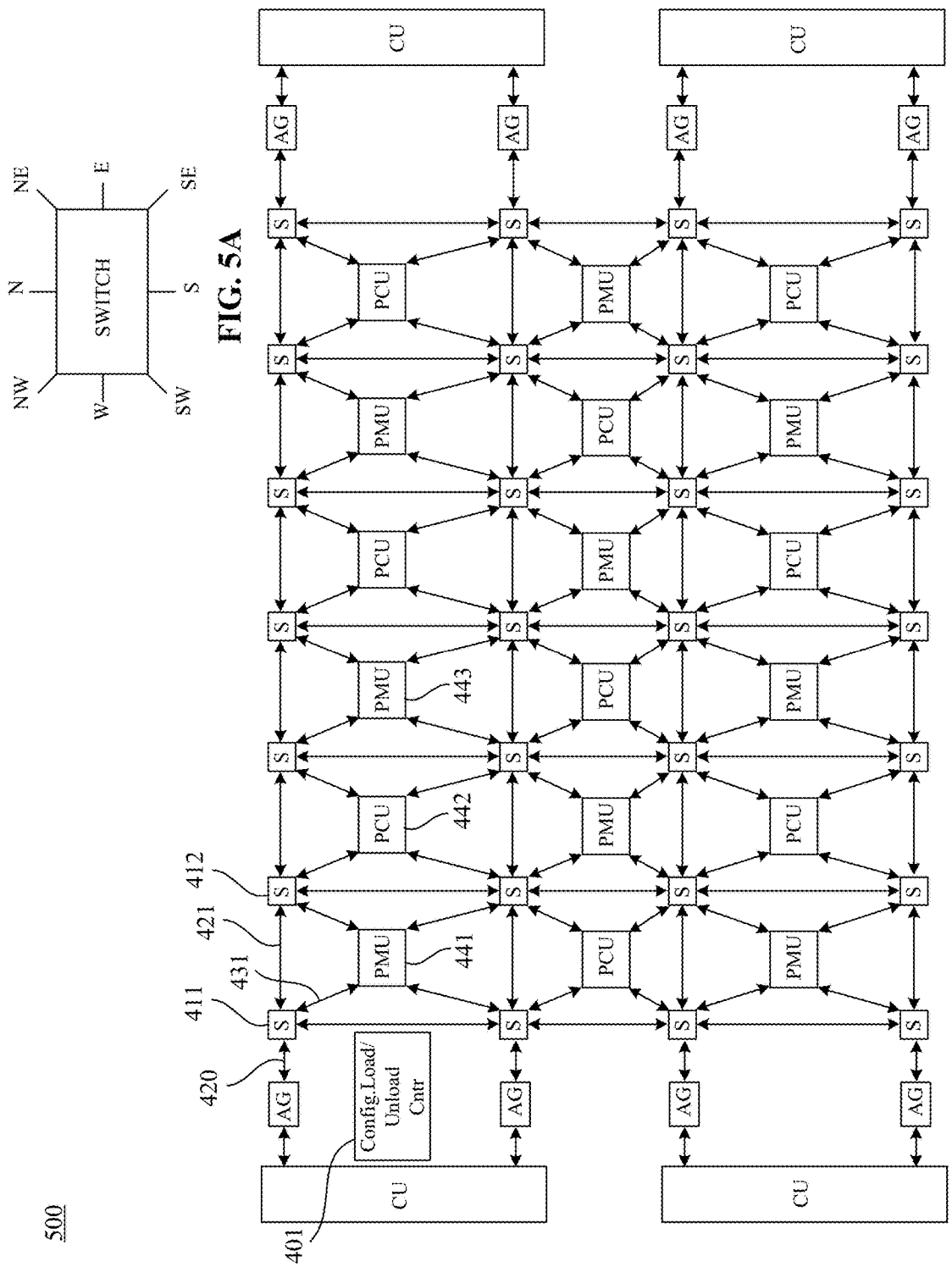
FIG. 5 illustrates an example switch unit connecting elements in an array level network, according to various embodiments.

FIG. 5 is a simplified diagram of a tile and an array level network usable in the configuration of FIG. 4, where the configurable units in the array are nodes on the array level network and are configurable to implement a lookup table with a sub-table.

In this example, the array of configurable units 500 includes a plurality of types of configurable units. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. In this example, the PCUs (e.g. 442) and PMUs (e.g. 443) in the array of configurable units 500 can include resources configurable for implementation of a computation unit, an example configuration of which is described herein (e.g. FIG. 9). Each of these configurable units contains a configuration store comprising a set of registers or flip-flops that represent either the setup or the sequence to run a program, and can include the number of nested loops, the limits of each loop iterator, the routes and/or instructions to be executed for each stage including stages, the source of the operands, and the network parameters for the input and output interfaces. The configuration file can include entries of lookup tables as described herein.

Additionally, each of these configurable units contains a configuration store comprising a set of registers or flip-flops that store status usable to track progress in nested loops or otherwise. A configuration file in the configuration store contains a bit-stream representing the initial configuration, or starting state, of each of the components that execute the program. This bit-stream is referred to as a bit file. Program load is the process of setting up the configuration stores in the array of configurable units based on the contents of the bit file to allow the components to execute a program (i.e., a machine), including programs that utilize the lookup table with a sub-table. Program Load may also require the load of all PMU memories.

The array level network includes links interconnecting configurable units in the array. The links in the array level network include one or more and, in this case, three kinds of physical buses: a chunk-level vector bus (e.g. 128 bits of data), a word-level scalar bus (e.g. 32 bits of data), and a multiple bit-level control bus. For instance, interconnect 421 between switch units 411 and 412 includes a vector bus interconnect with a vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload, and carry scalar operands or control information. In some machines implemented using this system, data can be represented using floating point data formats, including standard or non-standard formats. Example formats include FP32 and BF16, among others. It can be understood that the number of data values carried on the scalar and vector buses is a function of the encoding format of the data values, with FP32 utilizing 32 bits per value and BF16 using 16 bits per value.

The control bus can carry control handshakes such as tokens and other lines. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicate if the chunk is scratchpad memory or configuration store data.
Bits that form a chunk number
Bits that indicate a column identifier.
Bits that indicate a row identifier.
Bits that indicate a component identifier.

For a load operation, the configuration load controller can send the number N of chunks to a configurable unit in order from N−1 to 0. For this example, the 6 chunks are sent out in most-significant-bit-first order of Chunk 5→Chunk 4→Chunk 3→Chunk 2→Chunk 1→Chunk 0. (Note that this most-significant-bit-first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 5A illustrates an example switch unit connecting elements in an array level network. As shown in the example of FIG. 5A, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 441 can be sent from the configuration load/unload controller 401 to the PMU 441, via a link 420 between the configuration load/unload controller 401 and the West (W) vector interface of the switch unit 411, the switch unit 411, and a link 431 between the Southeast (SE) vector interface of the switch unit 411 and the PMU 441.

In this example, one of the AGCUs is configured to be a master AGCU, which includes a configuration load/unload controller (e.g. 401). The master AGCU implements a register through which the host (220, FIG. 2) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy-chained command bus (FIG. 5). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process, in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (250, FIG. 3). Each of the memory interfaces can be accessed using several AGCUs. Each AGCU contains a reconfigurable scalar data path to generate requests for the off-chip memory. Each AGCU contains FIFOs (first-in-first-out buffers for organizing data) to buffer outgoing commands, data, and incoming responses from the off-chip memory.

FIG. 6 is a block diagram illustrating an example configurable unit 500, such as a Pattern Compute Unit (PCU). A configurable unit can interface with the scalar, vector, and control buses, in this example using three corresponding sets of inputs and outputs (IO): scalar inputs/outputs, vector inputs/outputs, and control inputs/outputs. Scalar IOs can be used to communicate single words of data (e.g. 32 bits). Vector IOs can be used to communicate chunks of data (e.g. 128 bits), in cases such as receiving configuration data in a unit configuration load process, and transmitting and receiving data during operation after configuration across a long pipeline between multiple PCUs. Control IOs can be used to communicate signals on control lines such as the start or end of execution of a configurable unit. Control inputs are received by control block 570, and control outputs are provided by the control block 570.

Each vector input is buffered in this example using a vector FIFO in a vector FIFO block 560 which can include one or more vector FIFOs. Likewise in this example, each scalar input is buffered using a scalar FIFO 550. Using input FIFOs decouples timing between data producers and consumers, and simplifies inter-configurable-unit control logic by making it robust to input delay mismatches.

A configurable unit includes multiple reconfigurable data paths in block 580. A data path in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each data path in the configurable unit. The configuration serial chain in the configuration data store 520 is connected to the multiple data paths in block 580 via lines 521.

A configurable data path organized as a multi-stage pipeline can include multiple functional units (e.g. 581, 582, 583; 584, 585, 586) at respective stages. A computation unit or parts of a computation unit can be implemented in multiple functional units at respective stages in a multi-stage pipeline or in multiple multi-stage pipelines, as described in FIG. 9. Input registers in functional units can register inputs from scalar FIFOs 550 or Vector FIFOs 560 or from previous stages in a multi-stage pipeline. A functional unit at a stage in a multi-stage pipeline can execute a function, e.g., logical shift, an arithmetic function, comparison, a logical operation, etc., and generate an output.

Configurable units in the array of configurable units include configuration data stores 520 (e.g. serial chains) to store unit files comprising a plurality of chunks (or sub-files of other sizes) of configuration data particular to the corresponding configurable units. Configurable units in the array of configurable units each include unit configuration load logic 540 connected to the configuration data store 520 via line 522, to execute a unit configuration load process. The unit configuration load process includes receiving, via the bus system (e.g. the vector inputs), chunks of a unit file particular to the configurable unit, and loading the received chunks into the configuration data store 520 of the configurable unit. The unit file loaded into the configuration data store 520 can include configuration data, including opcodes and routing configuration, for circuits (e.g. module) implementing a lookup table with a sub-table as described herein.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 510 can be provided to a vector FIFO as vector inputs, and then be transferred to the configuration data store 520. Output configuration data 530 can be unloaded from the configuration data store 520 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 5, a daisy-chained completion bus 591 and a daisy-chained command bus 592 are connected to daisy-chain logic 593, which communicates with the unit configuration load logic 540. The daisy-chain logic 593 can include load complete status logic, as described below. The daisy-chained completion bus is further described below. Other topologies for the command and completion buses are clearly possible but not described here.

FIG. 7 is a block diagram illustrating an example configurable unit 600, such as a Pattern Memory Unit (PMU). A PMU can contain scratchpad memory 630 coupled with a reconfigurable scalar data path 620 intended for address calculation (RA, WA) and control (WE, RE) of the scratchpad memory 630, along with the bus interfaces used in the PCU (FIG. 5).

The bus interfaces can include scalar inputs, vector inputs, scalar outputs and vector outputs, usable to provide write data WD. The data path can be organized as a multi-stage reconfigurable pipeline, including stages of functional units FUs and associated pipeline registers PRs that register inputs and outputs of the functional units. PMUs can be used to store distributed on-chip memory throughout the array of reconfigurable units.

A scratchpad is built with multiple SRAM banks (e.g. 631-634). Banking and buffering logic 635 for the SRAM banks in the scratchpad can be configured to operate in several banking modes to support various access patterns. A computation unit as described herein can include a PMUs store intermediary values written by functional units of the PCUs, the intermediary values stored in the scratchpad memory 630. In a computation unit as described herein, the scalar data path 620 can be used for reading data from PMUs and/or writing data to PMUs utilizing the addressing format of the SRAM scratchpad memory 630, adding appropriate offsets and so on, to read the data entries stored in the scratchpad memory 630. Additionally, or alternatively, the vector data path may be utilized for storing batch elements for input to a PCU. Each PMU can include write address calculation logic and read address calculation logic that provide write address WA, write enable WE, read address RA and read enable RE to the banking buffering logic 635. Based on the state of the local FIFOs 611 and 612 and external control inputs, the control block 615 can be configured to trigger the write address computation, read address computation, or both, by enabling the appropriate counters 616.

A programmable counter chain (Control Inputs, 616, Control Outputs) and control block 615 can trigger PMU execution.

In various embodiments, a computation unit may include an array of configurable units in a reconfigurable data processor, like that represented by FIGS. 3-7. Thus, in a reconfigurable data processor, in an array of configurable units connected to a bus system, configurable units in the array include configuration data stores to store configuration data that establishes data flow and execution parameters for a machine. The machine can include a computation unit formed at least in part using the configurable resources in the array. As discussed above, the configurable units in the array can include execution units, configurable using a configuration file to execute a number of functions. In some embodiments, the configuration file can provide an opcode to specify the function to be executed, and the constant which can be used as immediate data in the execution of the function. In some embodiments, the opcode and immediate data can be provided from other sources.

In the configuration, a floating-point Input I may be supplied to a circuit. The input I has a sign bit, an E bit exponent and an M bit mantissa. For instance, the floating point input I can be in the FP32 floating point format, which includes a sign bit, an 8-bit exponent (E=8) and a 23 bit mantissa (M=23), for a total of 32 bits.

Figure 8:
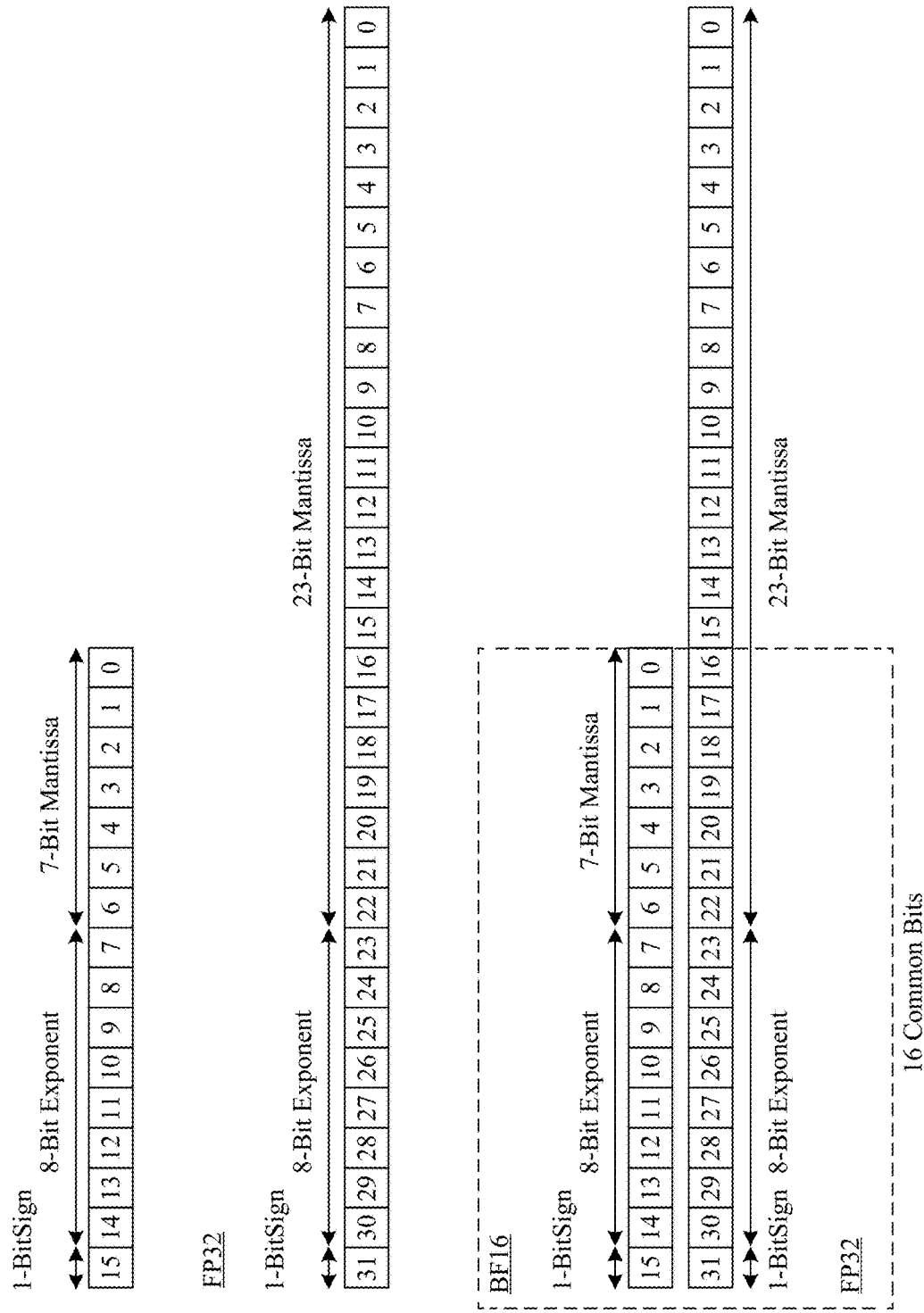
FIG. 8 illustrates a bit-wise comparison of the FP32 data format and the BF16 data format, according to various embodiments.

FIG. 8 is a bit-wise comparison of exemplary low-precision and high-precision representations of input elements, according to various embodiments. In various embodiments, input elements may include elements that are represented in various data formats, such as floating-point formats. For example, FIG. 8 illustrates the 32-bit floating-point (FP32) data format and the 16-bit Bfloat (BF16) data format. For example, and not by way of limitation, an element may be represented in a low-precision data format, such as the BF16 data format. The BF16 data format assigns 16 bits of memory for storing a number. for example, BF16 supports a 7-bit mantissa (for example, bits [6:0]), an 8-bit exponent (for example, bits [14:7]) and a 1-bit sign (for example, bit [15]). The computation unit may also support input of high-precision data formats, such as 32-bit floating-point numbers (e.g., FP32). The FP32 data format assigns 32 bits of memory for storing a number. For example, FP32 supports a 23-bit mantissa (for example, bits [23:0]), an 8-bit exponent (for example, bits [30:23]) and a 1-bit sign (for example, bit [31:31]). Accordingly, the FP32 data format use twice as many bits as the BF16 data format in storing a number. Thus, performing computations on elements in the FP32 data format may have a higher computation cost relative to performing computations on elements in the BF16 data format.

In addition, the computation unit may convert data from a first data format to a second data format. For example, and not by way of limitation, the computation unit 100 may convert an element from the FP32 data format to the BF16 data format by truncating bits [15:0] from the FP32 number. Additionally, or alternatively, the computation unit may convert an element from the FP32 data format to the BF16 data format by performing stochastic rounding based on properties of the batch of elements.

Similarly, the computation unit 100 may convert an element from the BF16 data format to the FP32 data format by performing a multiplication operation between the BF16 number and a representation of the identity operator (i.e., 1) in the BF16 data format. The computation unit may further store the product of the multiplication operation in the FP32 data format by storing 32-bits of significant digits of the product.

Figure 9:
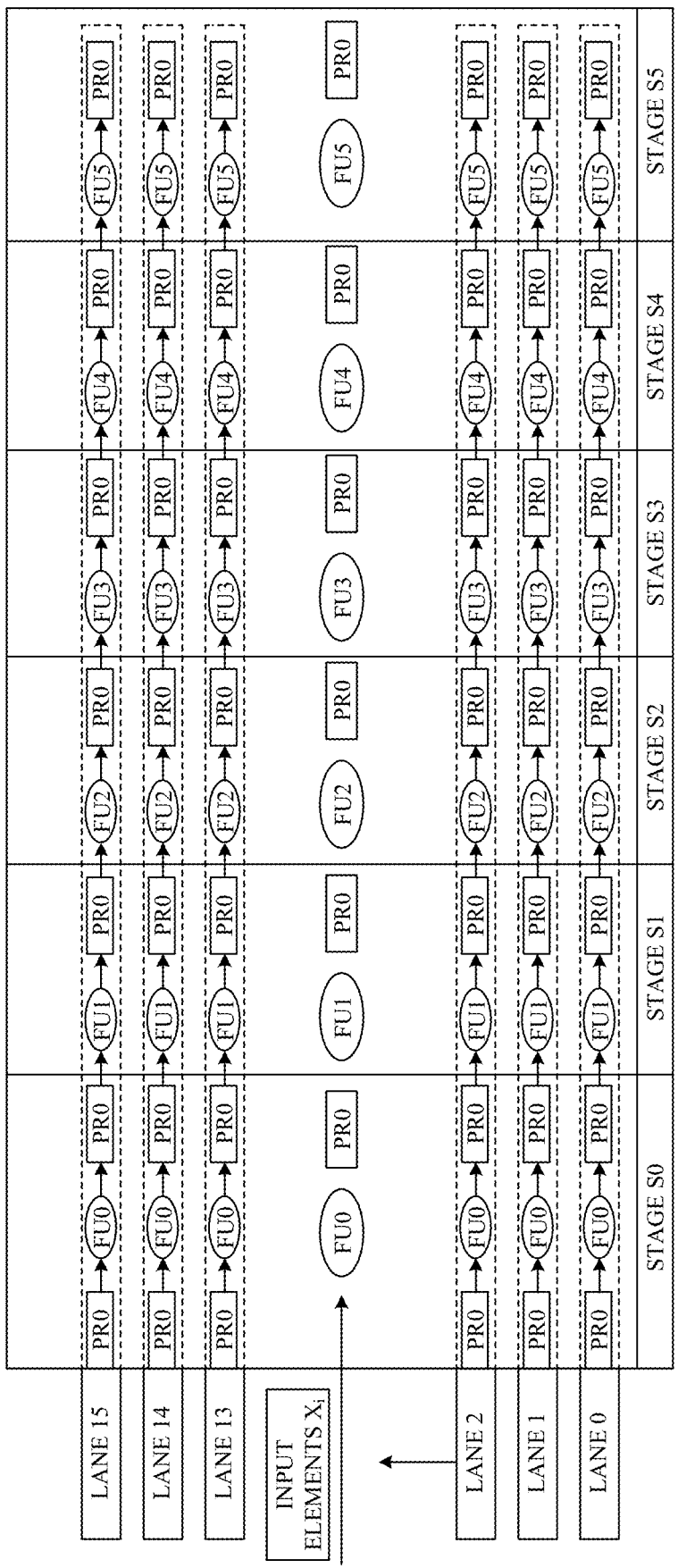
FIG. 9 is an illustration data flow through the PCU of FIG. 3, according to various embodiments.

FIG. 9 illustrates a multi-stage PCU 900, according to various embodiments. In the instance case, the PCU 900 includes 6 stages: S0, S1, S2, S3, S4, and S5. Each state may be associated with a functional unit. For example, S0 may be associated with functional unit FU0; S1 may be associated with functional unit FU1; S2 may be associated with functional unit FU2; S3 may be associated with functional unit FU3; S4 may be associated with functional unit FU4; and S5 may be associated with functional unit FU5.

In various embodiments, each stage may operate in series. For example, an input Xi may be received at state S0 by functional unit FU0. Functional unit FU0 may perform one or more floating-point operations to generate a resultant. The resultant of FU0 may be an input to functional units in any or all of stages S1, S2, S3, S4, and S5. For example, and not by way of limitation, FU0 may write the resultant to a pipeline register PR0. FU1 in stage S1 may perform a read operation on PR0 to obtain the FU0 resultant. Functional unit FU1 may utilize the FU0 resultant as an input for performing floating-point operations. In further embodiments, multiple pipeline registers may be utilized. For example, a PCU 900 may be connected via a bus 160 to a pipeline register 1 (PR1), a pipeline register 2 (PR2), a pipeline register 3 (PR3), etc. Functional units in each stage may perform read operations from one or more of the pipeline registers. Similarly, functional units may perform write operations to one or more of the functional units.

In further embodiments, the PCU 900 may enable computational processes to operate in parallel. For example, each stage may include multiple functional units. Each functional unit within a stage may be assigned to a data lane (e.g., lane 0, lane 1, lane 2, ..., lane 14, lane 15, etc.). Each functional unit may read data in parallel from one or more pipeline registers. Similarly, each functional unit may write data in parallel to one or more functional units.

Figure 10A:
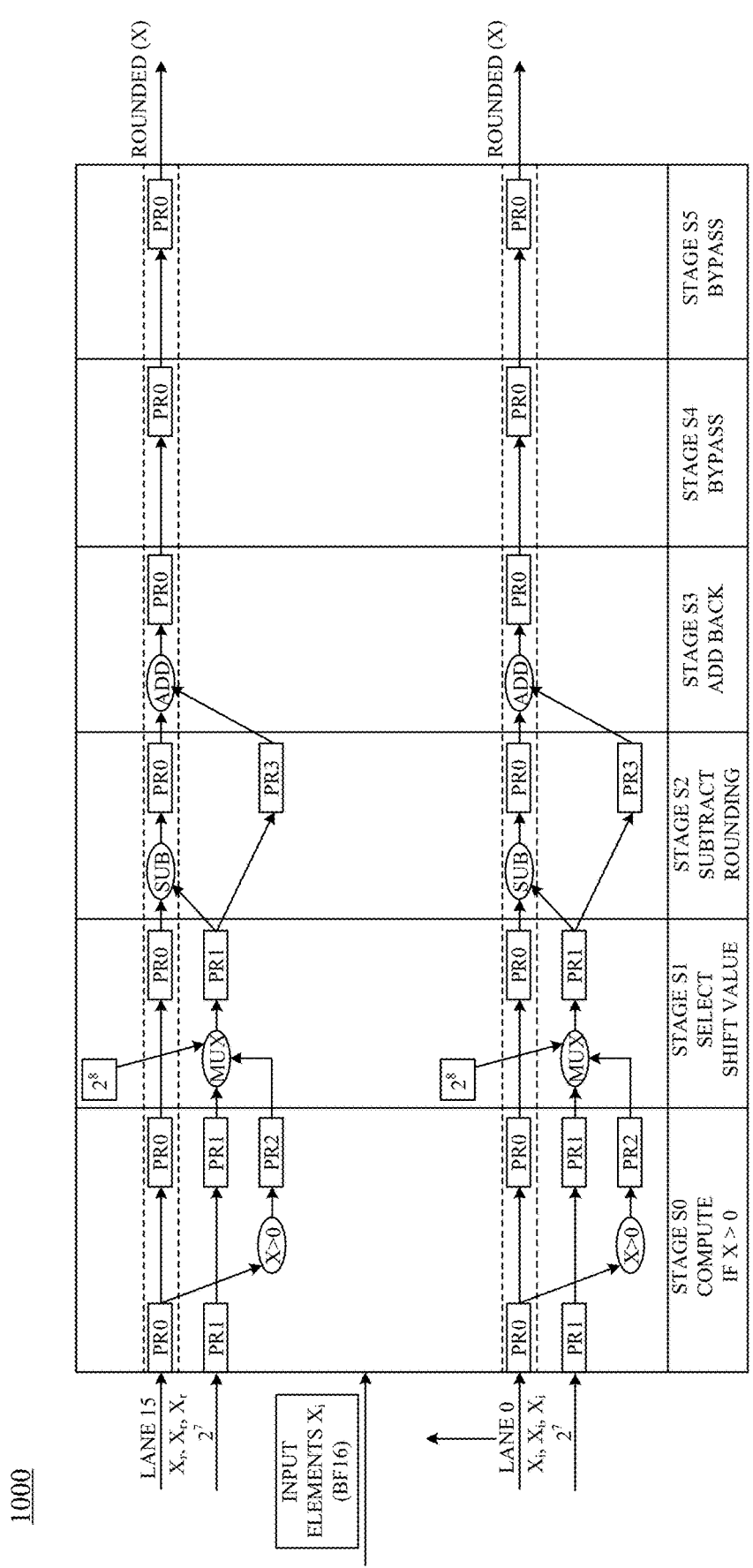
FIGS. 10A-10B illustrates computation units of FIG. 3 (e.g., PCUs) configured to compute an over-approximation (e.g., a ceiling value) of an input element, according to various embodiments.
Figure 10B:
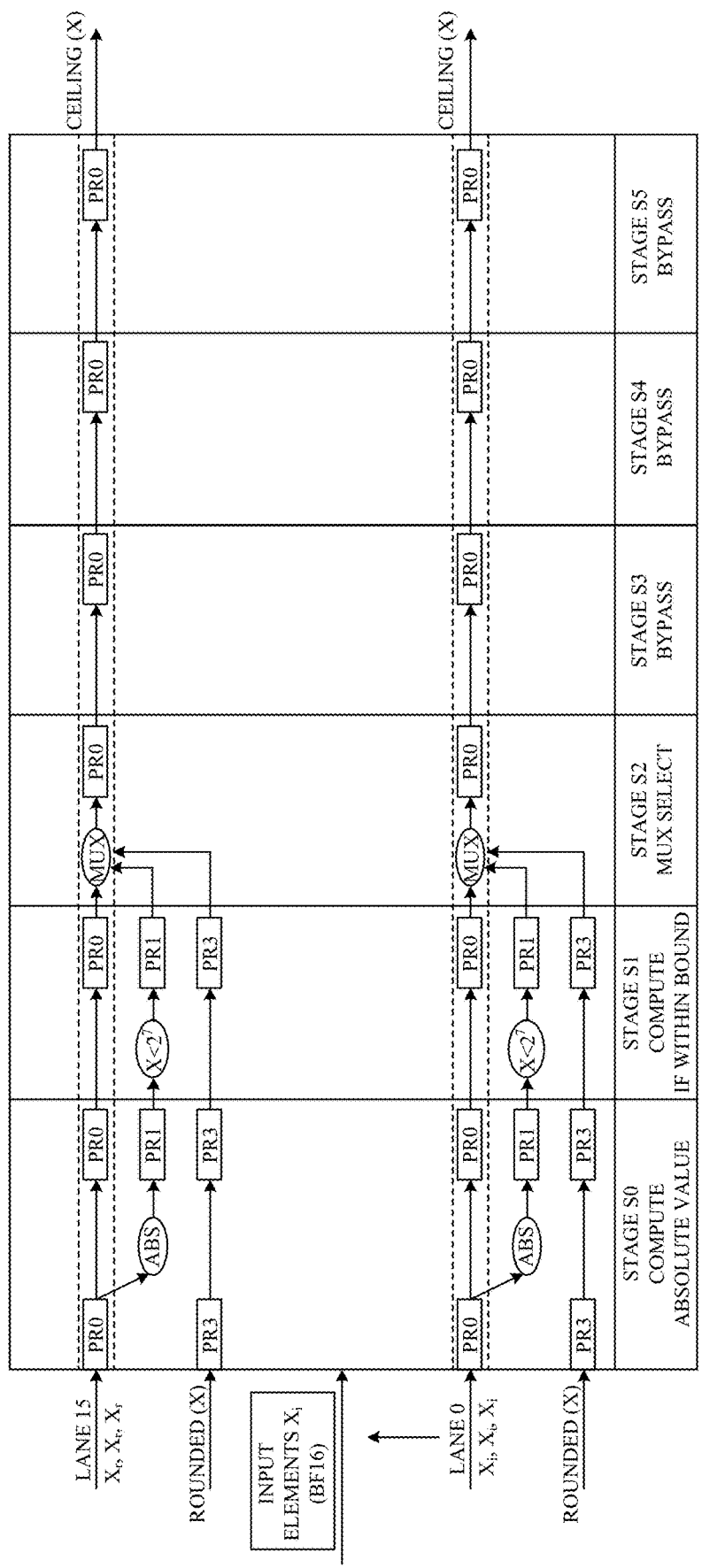

FIGS. 10A-10B illustrates computation units 1000 and 1010 (e.g., PCUs) configured to compute a ceiling value of an input element, according to various embodiments. In some embodiments, a ceiling value may be computed with two six-stage computation units (e.g., 1000 and 1010). Each computation unit 1000 and 1010 may include stages: S0, S1, S2, S3, S4, and S5. Each stage of the computation unit 1000 and 1010 may access one or more pipeline registers, e.g., PR0, PR1, PR2, PR3, and so forth. For example, one or more pipeline registers (e.g., PR0 and PR1) may store data between stages of the computation units 1000 and 1010.

FIG. 10A illustrates a first step in computing an over-approximation (e.g., a ceiling value) for an input element $x_i$, according to various embodiments. In some embodiments, the computation unit 1000 may include one or more pipeline registers with pre-loaded values. These pipeline registers may provide inputs to one or more stages of the computation unit 1000. For example, and not by way of limitation, the computation unit 1000 may include a pipeline register PR0 which stores one or more input elements X. In various embodiments, these input elements may be represented in a first format (e.g., BF16). In addition, the computation unit 1000 may include a pipeline register PR1. The pipeline register PR1 may store one or more constant values. For example, and not by way of limitation, the pipeline register PR1 may store constant value $2^7$.

In further embodiments, the stage S0 may include one or more functional units. For example, the stage S0 may include a comparator unit. The comparator unit may receive as an input one or more input elements X. For example, the comparator unit may perform a read operation on the pipeline register PR0 to obtain an $i^{th}$ element of input elements X, herein denoted $x_i$. In various embodiments, the input elements X may be represented in a first format (e.g., BF16).

Furthermore, the comparator unit may determine if the input is greater than 0. For example, the comparator unit may compute the sign and/or magnitude of input element $x_i$ to determine if input element $x_i$ is greater than 0. In various embodiments, the comparator unit may perform a read operation on a sign bit of input element $x_i$ (e.g., bit [15] for $x_i$ represented in the BF16 format) to determine the sign of input element $x_i$. In addition, the comparator unit may perform a read operation on one or more bits of the exponent and/or mantissa of input element $x_i$ to determine whether the magnitude of input element $x_i$ is greater than zero. In various embodiments, if the comparator unit determines that input element $x_i$ is greater than zero (e.g., if the sign of input element $x_i$ is positive and the magnitude of input element $x_i$ is greater than zero), then the comparator unit may perform a write operation to write the input element $x_i$ and/or a Boolean indicator of value 1 to a pipeline register (e.g., pipeline register PR2).

Alternatively, if the comparator unit determines that $x_i$ is not greater than zero (e.g., if the sign of the $x_i$ is not positive and/or if the magnitude of the $x_i$ is no greater than zero), then the comparator unit may perform a write operation to a Boolean indicator of value 0 to the pipeline register (e.g., pipeline register PR2). Accordingly, the comparator unit may function as a discriminator that sorts input elements by their value relative to zero and stores Boolean indicators for each element in a pipeline register (e.g., PR2).

Furthermore, the comparator unit may further classify an input element $x_i$. For example, and not by way of limitation, the comparator unit may analyze one or more bits of the mantissa of the input element $x_i$ and/or the exponent of the input element $x_i$. The comparator unit may determine the least bit that stores a non-zero value (e.g., the $2^2$ bit, the $2^{-2}$ bit, the $2^{-6}$ bit, etc.). Based on the least non-zero bit, the comparator unit may classify the input element as a type of number (e.g., an integer, a rational number, an irrational number, etc.). The comparator unit may further configure the computation unit 1000 to bypass input elements X that are associated with one or more types of numbers. For example, and not by way of limitation, the comparator unit may configure the computation unit 1000 to bypass input elements X corresponding to integers. Accordingly, in some embodiments, the computation unit 1000 may only process input elements X that include a non-zero mantissa bit (i.e., a fractional part.).

In further embodiments, stage S1 may include a selection (MUX) unit. The MUX unit may perform a read operation on a pipeline register (e.g., PR2) to obtain an input element $x_i$ and/or a Boolean indicator for each input element, $x_i$. In various embodiments, the MUX unit may determine based on the received input elements $x_i$ and/or the Boolean indicator that an input element $x_i$ is greater than zero. In additional embodiments, the MUX unit may also perform a read operation on a pipeline register PR1 to obtain a constant value stored in the pipeline register. For example, the pipeline register PR1 may store a constant value of $2^7$. In some embodiments, the constant value may correspond to a data format of the input elements. For example, and not by way of limitation, if the data format for each input element have a dynamic range of (–D, D), then R may be utilized as a constant value, where D and R may be positive numbers and R may be less than D. In various embodiments, R may be chosen based on one or more parameters, such as the value of the largest bit of the data format that represents an input element $x_i$. Furthermore, the MUX unit may obtain one or more additional inputs. For example, and not by way of limitation, the MUX unit may receive as an input a constant value (e.g., D, $2^8$).

In various embodiments, the MUX unit may select a shift value S based on the input element $x_i$. For example, in some embodiments, the MUX unit may select a shift value based on whether $x_i$ is greater than 0. For example, the MUX unit may select a larger shift value (e.g., D, $2^8$, etc.), for $x_i$ greater than zero. Additionally, or alternatively, the MUX unit may select a smaller shift value (e.g., R, $2^7$, etc.), for $x_i$ equal to or less than zero. In various embodiments, the MUX unit may perform a write operation to write the selected shift value S to a pipeline register (e.g., pipeline register PR1). In various embodiments, the pipeline register (e.g., PR1) may also write the selected shift value S to a second pipeline register (e.g., PR3).

In additional embodiments, stage S2 may include one or more subtraction (SUB) units and/or one or more rounding (RND) units, according to various embodiments. In some embodiments, a SUB unit may include a subtraction operator. The subtraction operator may receive two inputs and compute a difference of the two inputs. In various embodiments, the SUB unit may perform a read operation on a pipeline register (e.g., PR0) to obtain an input element $x_i$. The SUB unit may further perform a read operation on a pipeline register (e.g., PR1) to obtain a shift value S. The SUB unit may further input the input element $x_i$ and the shift value S to a subtraction operator. The subtraction operator may compute a difference ($x_i$–S) and output the difference to a RND unit. For example, if $x_i$ is greater than zero, then a larger shift value S may be utilized (e.g., $2^8$). If $x_i$ is equal to or less than zero, then a smaller shift value S may be utilized (e.g., $2^7$). In various embodiments, the SUB unit may shift the value of an input element $x_i$ from a primary region (e.g., (–R, R) or (–$2^7$, $2^7$)) to a shifted range (e.g., (–D, –D+R) or (–$2^8$, –$2^7$)).

For example, the subtraction operator may generate an intermediate data format to represent the difference ($x_i$–S). The subtraction operator may generate the intermediate data format based on an exponent difference: a difference between the exponent of the first input and the exponent of the second input. For example, if the exponent difference is 7 bits, then the subtraction operator may shift the first input by 7 bits relative to the second input. Alternatively, the subtraction operator may shift the second input by 7 bits relative to the first input. Herein, the unchanged input is denoted as the primary input. Shifting an input by one or more bits may alter the data format of that input. For example, and not by way of limitation, shifting the input may adjust the position of one or more mantissa bits, hidden bits, guard bits, round bits, sticky bits, and so forth. Accordingly, shifting the input may produce a data format that includes one or more additional bits of information relative to the input data format. The subtraction operator may further compute a difference between the primary input and the shifted input to compute the difference ($x_i$–S). In various embodiments, the difference may be represented in an intermediate data format. In some embodiments, the intermediate data format may include one or more bits of additional information relative to the data format of the primary input. For example, the primary input may be represented in a BF16 data format with 16 bits, while the intermediate data format may have more than 16 bits (e.g., a 17-bit data format, an 18-bit data format, a 20-bit data format, etc.).

In further embodiments, the RND unit may receive a difference ($x_i$–S) in the intermediate data format from the SUB unit. In various embodiments, the RND unit may perform one or more rounding operations on the difference. For example, and not by way of limitation, the RND unit may include a round-to-zero (RTZ) unit. The RTZ unit may perform a rounding operation by truncating one or more bits from the difference, represented in the intermediate data format. In some embodiments, truncating one or more bits from the difference may convert the difference from the intermediate data format to the data format of the primary input. For example, and not by way of limitation, the data format of the primary input may be a BF16 format with 16 bits. The computed difference may be represented by the intermediate data format with more than 16 bits (e.g., 20 bits). For instance, the intermediate data format may include a mantissa with 4 additional bits relative to the mantissa of the BF16 format. Accordingly, the RTZ unit may truncate 4 bits from the mantissa of the intermediate data format, thereby converting the difference to the BF16 data format. In various embodiments, truncation of the computed difference by the RTZ unit may decrease the magnitude (i.e., absolute value) of the computed difference, thereby rounding a positive number downwards towards zero and rounding a negative number upwards towards zero. Thus, the RTZ unit may produce a rounded difference ($x_i$–S) that rounds up the difference ($x_i$–S) towards zero in the shifted range, e.g., ($-2^8$, $-2^7$). Accordingly, herein the rounded difference ($x_i$–S) will be denoted as Round ($x_i$–S). The RTZ unit may further perform a write operation to write the Round ($x_i$–S) to a pipeline register (e.g., PR0).

In further embodiments, stage S3 may include one or more addition (ADD) units, according to various embodiments. The ADD units may compute a rounded value for $x_i$, i.e., Round ($x_i$), from the rounded difference ($x_i$–S). For example, and not by way of limitation, an ADD unit may include an addition operator. The addition operator may receive two inputs and may compute a sum of the inputs. Accordingly, in various embodiments, the ADD unit may perform a read operation on a pipeline register (e.g., PR0) to obtain the rounded difference ($x_i$–S). The ADD unit may further perform a read operation on a pipeline register (e.g., PR3) to obtain a shift value S. The ADD unit may further compute the sum of the Round ($x_i$–S) and the shift value S. In various embodiments, computing the sum may shift the Round ($x_i$–S) from the shifted range, e.g., ($-2^8$, $-2^7$) to the primary range, e.g., ($-2^7$, $2^7$). In operation, adding the shift value S to the Round ($x_i$–S) in the shifted range, e.g., ($-2^8$, $-2^7$), may return a modified form of $x_i$. For instance, Round ($x_i$–S)+S=Round ($x_i$). Accordingly, the ADD unit may shift the Round ($x_i$–S) from the shifted range back to the primary range, e.g., ($-2^7$, $2^7$), to produce Round ($x_i$). The ADD unit may further perform a write operation to write the Round ($x_i$) to a pipeline register (e.g., PR0).

In various embodiments, functional units in stages S4 and S5 may be bypassed. For example, and not by way of limitation, these functional units may be configured to remain in an off state. Accordingly, these functional units may not perform read operations from pipeline registers, computational operations, or write operations to pipeline registers.

FIG. 10B illustrates a second step in computing an over-approximation (e.g., a ceiling value) for an input element $x_i$, according to various embodiments. In some embodiments, the computation unit 1010 may include one or more pipeline registers with pre-loaded values. These pipeline registers may provide inputs to one or more stages of the computation unit 1010. For example, and not by way of limitation, the computation unit 1010 may include a pipeline register PR0 which stores one or more input elements X. In various embodiments, these input elements may be represented in a first format (e.g., BF16). In addition, the computation unit 1010 may include a pipeline register PR3. The pipeline register PR3 may store one or more outputs of the computation unit 1000. For example, and not by way of limitation, the pipeline register PR3 may store one or more Round ($x_i$) values written by the computation unit 1000 to a pipeline register PR1, accordingly to various embodiments.

In further embodiments, the stage S0 may include one or more functional units. For example, the stage S0 may include an absolute-value (ABS) unit. The ABS unit may receive as an input one or more input elements X. For example, the ABS unit may perform a read operation on the pipeline register PR0 to obtain an $i^{th}$ element of input elements X, herein denoted $x_i$. In various embodiments, the input elements X may be represented in a first format (e.g., BF16).

Furthermore, the ABS unit may compute the absolute value of the input element $x_i$. For example, and not by way of limitation, the ABS unit may compute the absolute value by determining a magnitude of the input element $x_i$. For instance, if the input element $x_i$ is represented in the BF16 data format, then the ABS unit may compute the magnitude of the exponent bits and mantissa bits (i.e., bits [14:0]), while omitting the sign bit (i.e., bit [15]). Additionally or alternatively, the ABS unit may include a multiplication operator that computes the product of $x_i$ and $x_i$, the product being $x_i \times x_i = x_i^2$. The ABS unit may further include a square root operator. In various embodiments, the square root operator may receive the product $x_i^2$ as an input and may further compute the square root of the product, the square root being $\sqrt{(x_i^2)}$. In various embodiments, the square root of the product may be the absolute value of $x_i$, denoted ABS ($x_i$). Accordingly, the square root of the product or $\sqrt{(x_i^2)}$ =ABS ($x_i$)=|$x_i$|. For example, the square root operator may implement one or more root-finding algorithms in computing the square root of $x_i^2$, including, for example and not by way of limitation, Newton's method, and so forth. In various embodiments, the ABS unit may write ABS ($x_i$) to a pipeline register (e.g., PR1).

In further embodiments, the stage S1 may include one or more functional units. For example, the stage S0 may include a comparator unit. The comparator unit may receive as an input the absolute value of one or more input elements X. For example, the comparator unit may perform a read operation on the pipeline register PR1 to obtain an absolute value for an $i^{th}$ element of input elements X, herein denoted ABS ($x_i$).

Furthermore, the comparator unit may determine if the input is within a bound, e.g., R, $2^7$, etc. In various embodiments, the bound may correspond to a primary range corresponding to a data format utilized to represent elements of input elements X. In some embodiments, computing Round ($x_i$) for input elements $x_i$ with absolute values that fall outside of the bound may lead to computational errors. Accordingly, the computation unit 1010 may determine if the absolute value of each input element $x_i$ fall within the bound and further input the result to a subsequent computational stage.

For example, and by way of limitation, the comparator unit may perform a bit-wise comparison between the inputs ABS $(x_i)$ and the bound. In some embodiments, the comparator unit may include a comparator operator that may perform a bit-wise comparison of one or more bits of the exponent of each input: the ABS $(x_i)$ and the bound. The comparator operator may compare the values stored in the largest bit of the exponents for each input. If the values are the same, then the comparator operator may continue to the next largest bit and perform another comparison. If the values are similar for all exponent bits, then the comparator operator may continue by comparing the values of the inputs for each mantissa bit. If the values are similar for the exponent bits and the mantissa bits, then the comparator operator may output to the comparator unit the value of the bound, e.g., $2^7$. If the values are different for at least one exponent bit and/or at least one mantissa bit, then the comparator operator may select the input with the largest value for the largest exponent bit as the greater input. If the values for each of the exponent bits are similar for both inputs, then the comparator operator may select the input with the largest value for the largest mantissa bit as the greater input. The comparator operator may output the result to the comparator unit. In various embodiments, if the comparator unit receives the value of the bound, e.g., $2^7$, then the comparator unit may determine that the input is not within the bound. If the comparator unit determines that the input is not less than a bound, e.g., $2^7$, then the comparator unit may write a Boolean variable of 0 to a pipeline register (e.g., PR1). Additionally, or alternatively, if the comparator unit receives a value that is not the bound, then the comparator unit may determine that the ABS $(x_i)$ is less than the bound. In various embodiments, if the comparator unit determines that the input is less than the bound, then the comparator unit may write the ABS $(x_i)$ and/or a Boolean variable of 1 to a pipeline register (e.g., PR1). Accordingly, the pipeline register PR1 may store an indicator (e.g., ABS $(x_i)$ and/or a Boolean variable of 1), which indicates if the ABS $(x_i)$ is within a bound, e.g., $2^7$.

In additional embodiments, stage S2 may include one or more selection (MUX) units. A MUX unit may receive two or more inputs and output the greater of the two inputs. For example, the MUX unit may perform a read operation on a pipeline register (e.g., PR0) to obtain a input value $x_i$. In various embodiments, the MUX unit may also perform a read operation on a pipeline register (e.g., PR2) to obtain Round $(x_i)$ that may be generated by a computation unit 1000, in various embodiments. The MUX unit may also perform a read operation on a pipeline register (e.g., PR1) to receive an indicator. In various embodiments, the indicator may indicate if ABS $(x_i)$ is within a bound, e.g., $2^7$.

In various embodiments, the MUX unit may select an input that includes a maximum value. For example, and not by way of limitation, the MUX unit may access the indicator to determine if the ABS $(x_i)$ is within a bound. If the MUX unit determines that ABS $(x_i)$ is within the bound, then the MUX unit may perform a comparison operation on the inputs: $x_i$ and Round $(x_i)$. For example, and not by way of limitation, the MUX unit may include a comparator operator that executes a bit-wise comparison of the exponent bits and mantissa bits of each of inputs $x_i$ and Round $(x_i)$. The comparator operator may further output the larger of the inputs to the MUX unit. The MUX unit may receive the larger input as an output of the comparator and further write the output to a pipeline register (e.g., PR0). In various embodiments, the output may be designated as Ceiling $(x_i)$. In various embodiments, if MUX unit determines that ABS $(x_i)$ is not within the bound, then the MUX unit may output $x_i$ to a pipeline register. In various embodiments, the outputted $x_i$ may further be designated as Ceiling $(x_i)$.

In various embodiments, functional units in stages S3, S4, and S5 may be bypassed. For example, and not by way of limitation, these functional units may be configured to remain in an off state. Accordingly, these functional units may not perform read operations from pipeline registers, computational operations, or write operations to pipeline registers.

In sum, the computation units 1000 and 1010 compute a ceiling value for an input element $x_i$, herein denoted as Ceiling $(x_i)$. For example, computation unit 1000 may receive one or more input elements $x_i$, as well as a constant value, e.g., $2^7$ as an input to a stage S0 of the computation unit 1010. The computation unit 1000 may further include a comparator unit that sorts input elements and/or Boolean indicators corresponding to input elements into pipeline registers based on whether the input is greater than zero. The sorted input elements and/or indicators may further be input to a further stage S1 of the computation unit 1000 that includes one or more MUX units. The MUX units may select a shift value for each input element. For example, the MUX units may select a larger shift value for input elements greater than 0 and a smaller shift value for inputs elements less than or equal to zero. In a further stage S2 of the computation unit 1000, a SUB unit may shift the value of an input element from a primary range to a shifted range. Further, an RND unit may compute a rounded value for the shifted input element. In an additional stage S3 of the computation unit 1000, an ADD unit may shifted the rounded value from the shifted range to a primary range. In various embodiments, the rounded value in the primary range may be denoted as Round $(x_i)$.

Furthermore, a computation unit 1010 may perform second step in computing the ceiling value for an input element $x_i$, Ceiling $(x_i)$. For example, computation unit 1010 may receive one or more input elements $x_i$, as well as one or more rounded values, Round $(x_i)$, as an input to a stage S0 of the computation unit 1010. The computation unit 1010 may further include an ABS unit that computes an absolute value of each input element $x_i$, herein denoted as ABS $(x_i)$. In an additional stage S1 of the computation unit 1010, a comparator unit may determine if ABS $(x_i)$ is within a bound, e.g., $2^7$. In a further stage S2 of the computation unit 1010, a MUX unit may select the larger of $x_i$ and Round $(x_i)$, if ABS $(x_i)$ is within the bound. In various embodiments, the MUX unit may output the larger of $x_i$ and Round $(x_i)$ to a pipeline register, where the selected larger value is herein denoted as Ceiling $(x_i)$.

Accordingly, the computation units 1000 and 1010 compute Ceiling $(x_i)$ from an input element $x_i$ by shifting the value of an input element to a shifted range, rounding the input elements in the shifted range, and returning the rounded elements back to a primary range. In addition, the computation unit 1010 reduces the likelihood of errors in computing a ceiling value by comparing each rounded element to a corresponding input element and selecting the maximum of the rounded element and the input element as the Ceiling $(x_i)$. In addition, the computation unit 1010 computes the absolute value of each input element $(x_i)$ and compares each absolute value to a bound. In various embodiments, the bound may correspond to a primary range corresponding to a data format utilized to represent elements of input elements X. Accordingly, if an input element $x_i$ falls outside of the primary range, then, to minimize the likelihood of computational errors, the computation unit 1010 may select the input element $x_i$ as the Ceiling ($x_i$). For example, shifting input elements that fall outside of the bounded region by a constant shift value may cause these elements to fall outside of a shifted region. In some embodiments, rounding elements that fall outside of the shifted region may lead to computational errors. Thus, the computation units 1000 and 1010 may compute Ceiling ($x_i$) for one or more input elements, while reducing the likelihood of computational errors (e.g., rounding errors) in the computed Ceiling ($x_i$).

Figure 11A:
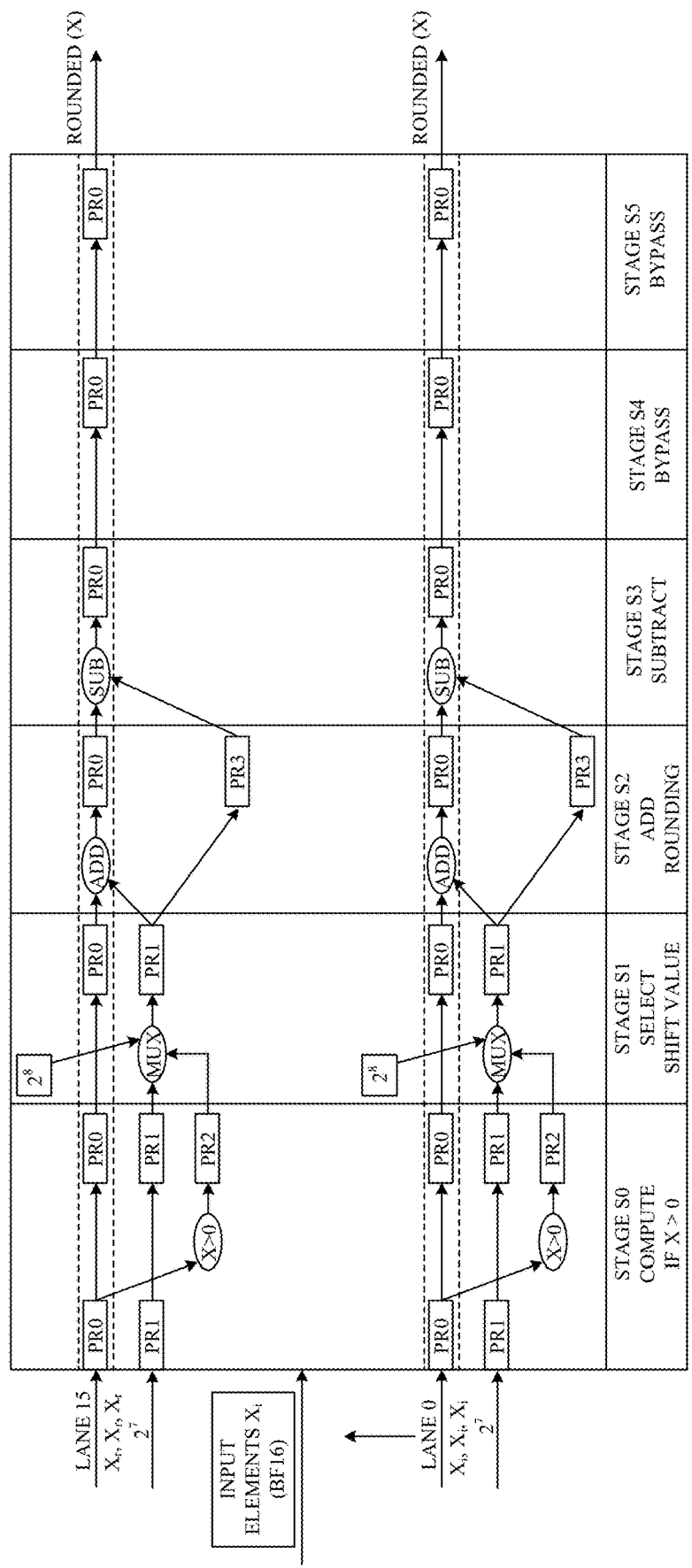
FIGS. 11A-11B illustrates computation units of FIG. 3 (e.g., PCUs) configured to compute an under-approximation (e.g., a floor value) of an input element, according to various embodiments.
Figure 11B:
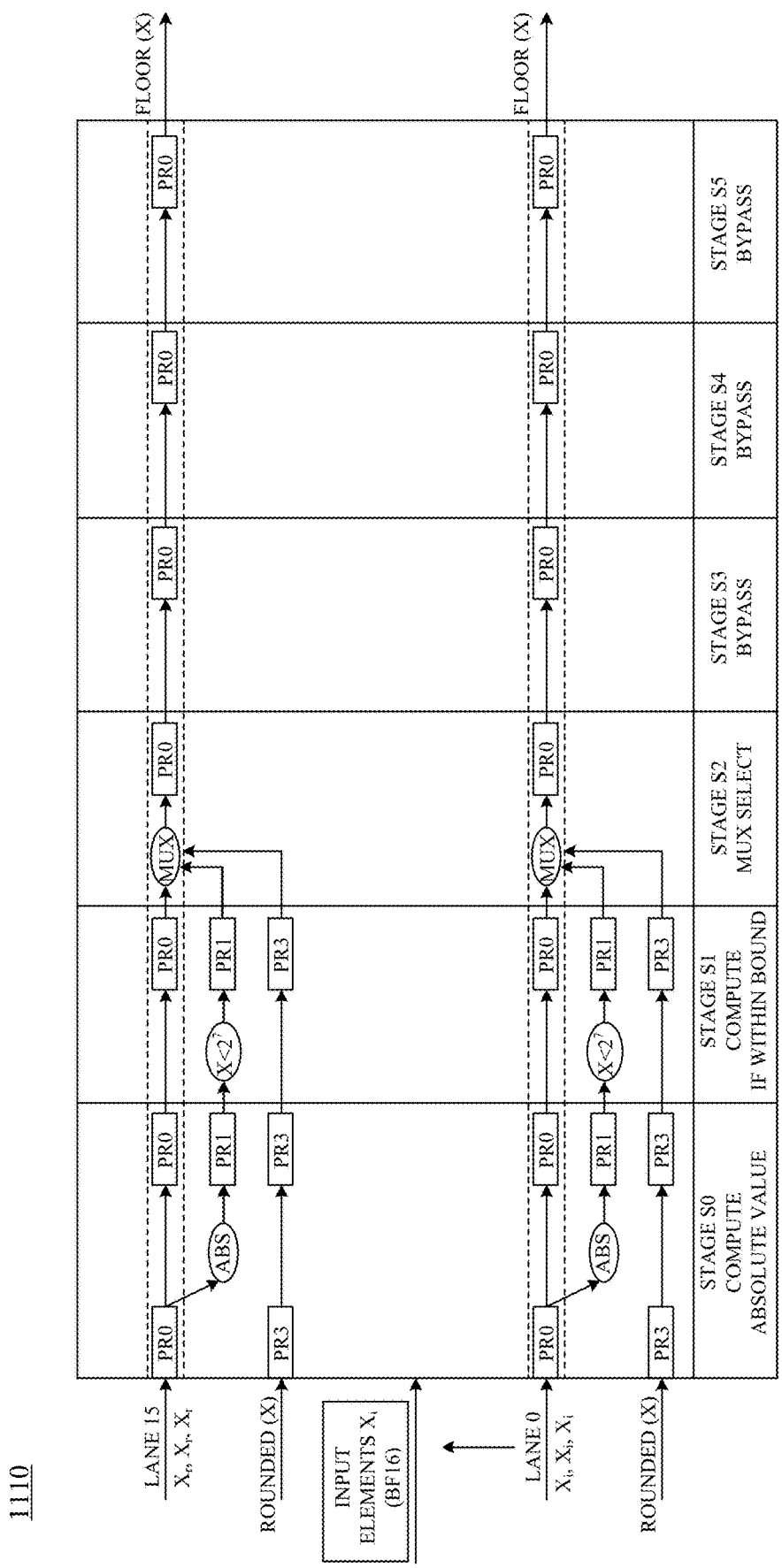

FIGS. 11A-11B illustrates computation units 1100 and 1110 (e.g., PCUs) configured to compute a floor value of an input element, according to various embodiments. In some embodiments, a floor value may be computed with two six-stage computation units (e.g., 1100 and 1110). Each computation unit 1100 and 1110 may include stages: S0, S1, S2, S3, S4, and S5. Each stage of the computation unit 1100 and 1110 may access one or more pipeline registers, e.g., PR0, PR1, PR2, PR3, and so forth. For example, one or more pipeline registers (e.g., PR0 and PR1) may store data between stages of the computation units 1100 and 1110.

FIG. 11A illustrates a first step in computing an under-approximation (e.g., a floor value) for an input element $x_i$, according to various embodiments. In some embodiments, the computation unit 1100 may include one or more pipeline registers with pre-loaded values. These pipeline registers may provide inputs to one or more stages of the computation unit 1100. For example, and not by way of limitation, the computation unit 1100 may include a pipeline register PR0 which stores one or more input elements X. In various embodiments, these input elements may be represented in a first format (e.g., BF16). In addition, the computation unit 1100 may include a pipeline register PR1. The pipeline register PR1 may store one or more constant values. For example, and not by way of limitation, the pipeline register PR1 may store constant value $2^7$.

In further embodiments, the stage S0 may include one or more functional units. For example, the stage S0 may include a comparator unit. The comparator unit may receive as an input one or more input elements X. For example, the comparator unit may perform a read operation on the pipeline register PR0 to obtain an $i^{th}$ element of input elements X, herein denoted $x_i$. In various embodiments, the input elements X may be represented in a first format (e.g., BF16).

Furthermore, the comparator unit may determine if the input is greater than 0. For example, the comparator unit may compute the sign and/or magnitude of input element $x_i$ to determine if input element $x_i$ is greater than 0. In various embodiments, the comparator unit may perform a read operation on a sign bit of input element $x_i$ (e.g., bit [15:15] for $x_i$ represented in the BF16 format) to determine the sign of input element $x_i$. In addition, the comparator unit may perform a read operation on one or more bits of the exponent and/or mantissa of input element $x_i$ to determine whether the magnitude of input element $x_i$ is greater than zero. In various embodiments, if the comparator unit determines that input element $x_i$ is greater than zero (e.g., if the sign of input element $x_i$ is positive and the magnitude of input element $x_i$ is greater than zero), then the comparator unit may perform a write operation to write the input element $x_i$ and/or a Boolean indicator of value 1 to a pipeline register (e.g., pipeline register PR2).

Alternatively, if the comparator unit determines that $x_i$ is not greater than zero (e.g., if the sign of the $x_i$ is not positive and/or if the magnitude of the $x_i$ is no greater than zero), then the comparator unit may perform a write operation to a Boolean indicator of value 0 to the pipeline register (e.g., pipeline register PR2). Accordingly, the comparator unit may function as a discriminator that sorts input elements by their value relative to zero and stores Boolean indicators for each element in a pipeline register (e.g., PR2).

Furthermore, the comparator unit may further classify an input element $x_i$. For example, and not by way of limitation, the comparator unit may analyze one or more bits of the mantissa of the input element $x_i$ and/or the exponent of the input element $x_i$. The comparator unit may determine the least bit that stores a non-zero value (e.g., the $2^2$ bit, the $2^{-2}$ bit, the $2^{-6}$ bit, etc.). Based on the least non-zero bit, the comparator unit may classify the input element as a type of number (e.g., an integer, a rational number, an irrational number, etc.). The comparator unit may further configure the computation unit 1100 to bypass input elements X that are associated with one or more types of numbers. For example, and not by way of limitation, the comparator unit may configure the computation unit 1100 to bypass input elements X corresponding to integers. Accordingly, in some embodiments, the computation unit 1100 may only process input elements X that include a non-zero mantissa bit (i.e., a fractional part.).

In further embodiments, stage S1 may include a selection (MUX) unit. The MUX unit may perform a read operation on a pipeline register (e.g., PR2) to obtain an input element $x_i$ and/or a Boolean indicator for each input element, $x_i$. In various embodiments, the MUX unit may determine based on the received input elements $x_i$ and/or the Boolean indicator that an input element $x_i$ is greater than zero. In additional embodiments, the MUX unit may also perform a read operation on a pipeline register PR1 to obtain a constant value stored in the pipeline register. For example, the pipeline register PR1 may store a constant value of $2^7$. In some embodiments, the constant value may correspond to a data format of the input elements. For example, and not by way of limitation, if the data format for each input element have a dynamic range of (−D, D), then R may be utilized as a constant value, where D and R may be positive numbers and R may be less than D. In various embodiments, R may be chosen based on one or more parameters, such as the value of the largest bit of the data format that represents an input element $x_i$. Furthermore, the MUX unit may obtain one or more additional inputs. For example, and not by way of limitation, the MUX unit may receive as an input a constant value (e.g., D, $2^8$).

In various embodiments, the MUX unit may select a shift value S based on the input element $x_i$. For example, in some embodiments, the MUX unit may select a shift value based on whether $x_i$ is greater than 0. For example, the MUX unit may select a larger shift value (e.g., D, $2^8$, etc.), for $x_i$ greater than zero. Additionally, or alternatively, the MUX unit may select a smaller shift value (e.g., R, $2^7$, etc.), for $x_i$ equal to or less than zero. In various embodiments, the MUX unit may perform a write operation to write the selected shift value S to a pipeline register (e.g., pipeline register PR1). In various embodiments, the pipeline register (e.g., PR1) may also write the selected shift value S to a second pipeline register (e.g., PR3).

In additional embodiments, stage S2 may include one or more addition (ADD) units and/or one or more rounding (RND) units, according to various embodiments. In some embodiments, an ADD unit may include an addition operator. The addition operator may receive two inputs and compute a sum of the two inputs. In various embodiments, the ADD unit may perform a read operation on a pipeline register (e.g., PR0) to obtain an input element $x_i$. The ADD unit may further perform a read operation on a pipeline register (e.g., PR1) to obtain a shift value S. The ADD unit may further input the input element $x_i$ and the shift value S to an addition operator. The addition operator may compute a sum $(x_i+S)$ and output the sum to a RND unit. For example, if $x_i$ is greater than zero, then a smaller shift value S may be utilized (e.g., $2^7$). If $x_i$ is equal to or less than zero, then a larger shift value S may be utilized (e.g., $2^8$). In various embodiments, the ADD unit may shift the value of an input element $x_i$ from a primary region (e.g., (−R, R) or ($-2^7$, $2^7$)) to a shifted range (e.g., (D−R, D) or ($2^7$, $2^8$)).

For example, the addition operator may generate an intermediate data format to represent the sum $(x_i+S)$. The addition operator may generate the intermediate data format based on an exponent difference: a difference between the exponent of the first input and the exponent of the second input. For example, if the exponent difference is 7 bits, then the addition operator may shift the first input by 7 bits relative to the second input. Alternatively, the addition operator may shift the second input by 7 bits relative to the first input. Herein, the unchanged input is denoted as the primary input. Shifting an input by one or more bits may alter the data format of that input. For example, and not by way of limitation, shifting the input may adjust the position of one or more mantissa bits, hidden bits, guard bits, round bits, sticky bits, and so forth. Accordingly, shifting the input may produce a data format that includes one or more additional bits of information relative to the input data format. The addition operator may further compute a difference between the primary input and the shifted input to compute the sum $(x_i+S)$. In various embodiments, the sum may be represented in an intermediate data format. In some embodiments, the intermediate data format may include one or more bits of additional information relative to the data format of the primary input. For example, the primary input may be represented in a BF16 data format with 16 bits, while the intermediate data format may have more than 16 bits (e.g., a 17-bit data format, an 18-bit data format, a 20-bit data format, etc.).

In further embodiments, the RND unit may receive a sum $(x_i+S)$ in the intermediate data format from the ADD unit. In various embodiments, the RND unit may perform one or more rounding operations on the sum. For example, and not by way of limitation, the RND unit may include a round-to-zero (RTZ) unit. The RTZ unit may perform a rounding operation by truncating one or more bits from the sum, represented in the intermediate data format. In some embodiments, truncating one or more bits from the sum may convert the sum from the intermediate data format to the data format of the primary input. For example, and not by way of limitation, the data format of the primary input may be a BF16 format with 16 bits. The computed sum may be represented by the intermediate data format with more than 16 bits (e.g., 20 bits). For instance, the intermediate data format may include a mantissa with 4 additional bits relative to the mantissa of the BF16 format. Accordingly, the RTZ unit may truncate 4 bits from the mantissa of the intermediate data format, thereby converting the sum to the BF16 data format. In various embodiments, truncation of the computed sum by the RTZ unit may decrease the magnitude (i.e., absolute value) of the computed sum, thereby rounding a positive number downwards towards zero and rounding a negative number upwards towards zero. Thus, the RTZ unit may produce a rounded sum $(x_i+S)$ that rounds down the sum $(x_i+S)$ towards zero in the shifted range, e.g., ($2^7$, $2^8$). Accordingly, herein the rounded sum $(x_i+S)$ will be denoted as Round $(x_i+S)$. The RTZ unit may further perform a write operation to write the Round $(x_i+S)$ to a pipeline register (e.g., PR0).

In further embodiments, stage S3 may include one or more subtraction (SUB) units, according to various embodiments. The SUB units may compute a rounded value for $x_i$, i.e., Rounded $(x_i)$, from the rounded sum $(x_i+S)$. For example, and not by way of limitation, a SUB unit may include a subtraction operator. The subtraction operator may receive two inputs and may compute a difference of the inputs. Accordingly, in various embodiments, the SUB unit may perform a read operation on a pipeline register (e.g., PR0) to obtain the rounded sum $(x_i+S)$. The SUB unit may further perform a read operation on a pipeline register (e.g., PR3) to obtain a shift value S. The SUB unit may further compute the difference of the Round $(x_i+S)$ and the shift value S. In various embodiments, computing the difference may shift the Round $(x_i+S)$ from the shifted range, e.g., ($2^7$, $2^8$) to the primary range, e.g., ($-2^7$, $2^7$). In operation, subtracting the shift value S from the Round $(x_i+S)$ in the shifted range, e.g., ($2^7$, $2^8$), may return a modified form of $x_i$. For instance, Round $(x_i+S)-S=$Round $(x_i)$. Accordingly, the SUB unit may shift the Round $(x_i+S)$ from the shifted range back to the primary range, e.g., ($-2^7$, $2^7$), to produce Round $(x_i)$. The SUB unit may further perform a write operation to write the Round $(x_i)$ to a pipeline register (e.g., PR0).

In various embodiments, functional units in stages S4 and S5 may be bypassed. For example, and not by way of limitation, these functional units may be configured to remain in an off state. Accordingly, these functional units may not perform read operations from pipeline registers, computational operations, or write operations to pipeline registers.

FIG. 11B illustrates a second step in computing an under-approximation (e.g., a floor value) for an input element $x_i$, according to various embodiments. In some embodiments, the computation unit 1110 may include one or more pipeline registers with pre-loaded values. These pipeline registers may provide inputs to one or more stages of the computation unit 1110. For example, and not by way of limitation, the computation unit 1110 may include a pipeline register PR0 which stores one or more input elements X. In various embodiments, these input elements may be represented in a first format (e.g., BF16). In addition, the computation unit 1110 may include a pipeline register PR3. The pipeline register PR3 may store one or more outputs of the computation unit 1100. For example, and not by way of limitation, the pipeline register PR3 may store one or more Round $(x_i)$ values written by the computation unit 1100 to a pipeline register PR1, accordingly to various embodiments.

In further embodiments, the stage S0 may include one or more functional units. For example, the stage S0 may include an absolute-value (ABS) unit. The ABS unit may receive as an input one or more input elements X. For example, the ABS unit may perform a read operation on the pipeline register PR0 to obtain an $i^{th}$ element of input elements X, herein denoted $x_i$. In various embodiments, the input elements X may be represented in a first format (e.g., BF16).

Furthermore, the ABS unit may compute the absolute value of the input element $x_i$. For example, and not by way of limitation, the ABS unit may compute the absolute value by determining a magnitude of the input element $x_i$. For instance, if the input element $x_i$ is represented in the BF16 data format, then the ABS unit may compute the magnitude of the exponent bits and mantissa bits (i.e., bits [14:0]), while omitting the sign bit (i.e., bit [15]). Additionally or alternatively, the ABS unit may include a multiplication operator that computes the product of $x_i$ and $x_i$, the product being $x_i \times x_i = x_i^2$. The ABS unit may further include a square root operator. In various embodiments, the square root operator may receive the product $x_i^2$ as an input and may further compute the square root of the product, the square root being $\sqrt{(x_i^2)}$. In various embodiments, the square root of the product may be the absolute value of $x_i$, denoted ABS $(x_i)$. Accordingly, the square root of the product or $\sqrt{(x_i^2)}$ =ABS $(x_i)$=$|x_i|$. For example, the square root operator may implement one or more root-finding algorithms in computing the square root of $x_i^2$, including, for example and not by way of limitation, Newton's method, and so forth. In various embodiments, the ABS unit may write ABS $(x_i)$ to a pipeline register (e.g., PR1).

In further embodiments, the stage S1 may include one or more functional units. For example, the stage S0 may include a comparator unit. The comparator unit may receive as an input the absolute value of one or more input elements X. For example, the comparator unit may perform a read operation on the pipeline register PR1 to obtain an absolute value for an $i^{th}$ element of input elements X, herein denoted ABS $(x_i)$.

Furthermore, the comparator unit may determine if the input is within a bound, e.g., R, $2^7$, etc. In various embodiments, the bound may correspond to a primary range corresponding to a data format utilized to represent elements of input elements X. In some embodiments, computing Round $(x_i)$ for input elements $x_i$ with absolute values that fall outside of the bound may lead to computational errors. Accordingly, the computation unit 1110 may determine if the absolute value of each input element $x_i$ fall within the bound and further input the result to a subsequent computational stage.

For example, and by way of limitation, the comparator unit may perform a bit-wise comparison between the inputs ABS $(x_i)$ and the bound. In some embodiments, the comparator unit may include a comparator operator that may perform a bit-wise comparison of one or more bits of the exponent of each input: the ABS $(x_i)$ and the bound. The comparator operator may compare the values stored in the largest bit of the exponents for each input. If the values are the same, then the comparator operator may continue to the next largest bit and perform another comparison. If the values are similar for all exponent bits, then the comparator operator may continue by comparing the values of the inputs for each mantissa bit. If the values are similar for the exponent bits and the mantissa bits, then the comparator operator may output to the comparator unit the value of the bound, e.g., $2^7$. If the values are different for at least one exponent bit and/or at least one mantissa bit, then the comparator operator may select the input with the largest value for the largest exponent bit as the greater input. If the values for each of the exponent bits are similar for both inputs, then the comparator operator may select the input with the largest value for the largest mantissa bit as the greater input. The comparator operator may output the result to the comparator unit. In various embodiments, if the comparator unit receives the value of the bound, e.g., $2^7$, then the comparator unit may determine that the input is not within the bound. If the comparator unit determines that the input is not less than a bound, e.g., $2^7$, then the comparator unit may write a Boolean variable of 0 to a pipeline register (e.g., PR1). Additionally, or alternatively, if the comparator unit receives a value that is not the bound, then the comparator unit may determine that the ABS $(x_i)$ is less than the bound. In various embodiments, if the comparator unit determines that the input is less than the bound, then the comparator unit may write the ABS $(x_i)$ and/or a Boolean variable of 1 to a pipeline register (e.g., PR1). Accordingly, the pipeline register PR1 may store an indicator (e.g., ABS $(x_i)$ and/or a Boolean variable of 1), which indicates if the ABS $(x_i)$ is within a bound, e.g., $2^7$.

In additional embodiments, stage S2 may include one or more selection (MUX) units. A MUX unit may receive two or more inputs and output the greater of the two inputs. For example, the MUX unit may perform a read operation on a pipeline register (e.g., PR0) to obtain a input value $x_i$. In various embodiments, the MUX unit may also perform a read operation on a pipeline register (e.g., PR2) to obtain Round $(x_i)$ that may be generated by a computation unit 1100, in various embodiments. The MUX unit may also perform a read operation on a pipeline register (e.g., PR1) to receive an indicator. In various embodiments, the indicator may indicate if ABS $(x_i)$ is within a bound, e.g., $2^7$.

In various embodiments, the MUX unit may select an input that includes a minimum value. For example, and not by way of limitation, the MUX unit may access the indicator to determine if the ABS $(x_i)$ is within a bound. If the MUX unit determines that ABS $(x_i)$ is within the bound, then the MUX unit may perform a comparison operation on the inputs: $x_i$ and Round $(x_i)$. For example, and not by way of limitation, the MUX unit may include a comparator operator that executes a bit-wise comparison of the exponent bits and mantissa bits of each of inputs $x_i$ and Round $(x_i)$. The comparator operator may further output the smaller of the inputs to the MUX unit. The MUX unit may receive the smaller input as an output of the comparator and further write the output to a pipeline register (e.g., PR0). In various embodiments, the output may be designated as floor $(x_i)$. In various embodiments, if MUX unit determines that ABS $(x_i)$ is not within the bound, then the MUX unit may output $x_i$ to a pipeline register. In various embodiments, the outputted $x_i$ may further be designated as floor $(x_i)$.

In various embodiments, functional units in stages S3, S4, and S5 may be bypassed. For example, and not by way of limitation, these functional units may be configured to remain in an off state. Accordingly, these functional units may not perform read operations from pipeline registers, computational operations, or write operations to pipeline registers.

In sum, the computation units 1100 and 1110 compute a floor value for an input element $x_i$, herein denoted as floor $(x_i)$. For example, computation unit 1100 may receive one or more input elements $x_i$, as well as a constant value, e.g., $2^7$ as an input to a stage S0 of the computation unit 1110. The computation unit 1100 may further include a comparator unit that sorts input elements and/or Boolean indicators corresponding to input elements into pipeline registers based on whether the input is greater than zero. The sorted input elements and/or indicators may further be input to a further stage S1 of the computation unit 1100 that includes one or more MUX units. The MUX units may select a shift value for each input element. For example, the MUX units may select a smaller shift value for input elements greater than 0 and a larger shift value for inputs elements less than or equal to zero. In a further stage S2 of the computation unit 1100, an ADD unit may shift the value of an input element from a primary range to a shifted range. Further, an RND unit may compute a rounded value for the shifted input element. In an additional stage S3 of the computation unit 1100, a SUB unit may shifted the rounded value from the shifted range to a primary range. In various embodiments, the rounded value in the primary range may be denoted as Round ($x_i$).

Furthermore, a computation unit 1110 may perform second step in computing the floor value for an input element $x_i$, floor ($x_i$). For example, computation unit 1110 may receive one or more input elements $x_i$, as well as one or more rounded values, Round ($x_i$), as an input to a stage S0 of the computation unit 1110. The computation unit 1110 may further include an ABS unit that computes an absolute value of each input element $x_i$, herein denoted as ABS ($x_i$). In an additional stage S of the computation unit 1110, a comparator unit may determine if ABS ($x_i$) is within a bound, e.g., $2^7$. In a further stage S2 of the computation unit 1110, a MUX unit may select the smaller of $x_i$ and Round ($x_i$), if ABS ($x_i$) is within the bound. In various embodiments, the MUX unit may output the smaller of $x_i$ and Round ($x_i$) to a pipeline register, where the selected smaller value is herein denoted as floor ($x_i$).

Accordingly, the computation units 1100 and 1110 compute floor ($x_i$) from an input element $x_i$ by shifting the value of an input element to a shifted range, rounding the input elements in the shifted range, and returning the rounded elements back to a primary range. In addition, the computation unit 1110 reduces the likelihood of errors in computing a floor value by comparing each rounded element to a corresponding input element and selecting the minimum of the rounded element and the input element as the floor ($x_i$). In addition, the computation unit 1110 computes the absolute value of each input element ($x_i$) and compares the each absolute value to a bound. In various embodiments, the bound may correspond to a primary range corresponding to a data format utilized to represent elements of input elements X. Accordingly, if an input element $x_i$ falls outside of the primary range, then, to minimize the likelihood of computational errors, the computation unit 1110 may select the input element $x_i$ as the floor ($x_i$). For example, shifting input elements that fall outside of the bounded region by a constant shift value may cause these elements to fall outside of a shifted region. In some embodiments, rounding elements that fall outside of the shifted region may lead to computational errors. Thus, the computation units 1100 and 1110 may compute floor ($x_i$) for one or more input elements, while reducing the likelihood of computational errors (e.g., rounding errors) in the computed floor ($x_i$).

Figure 12A:
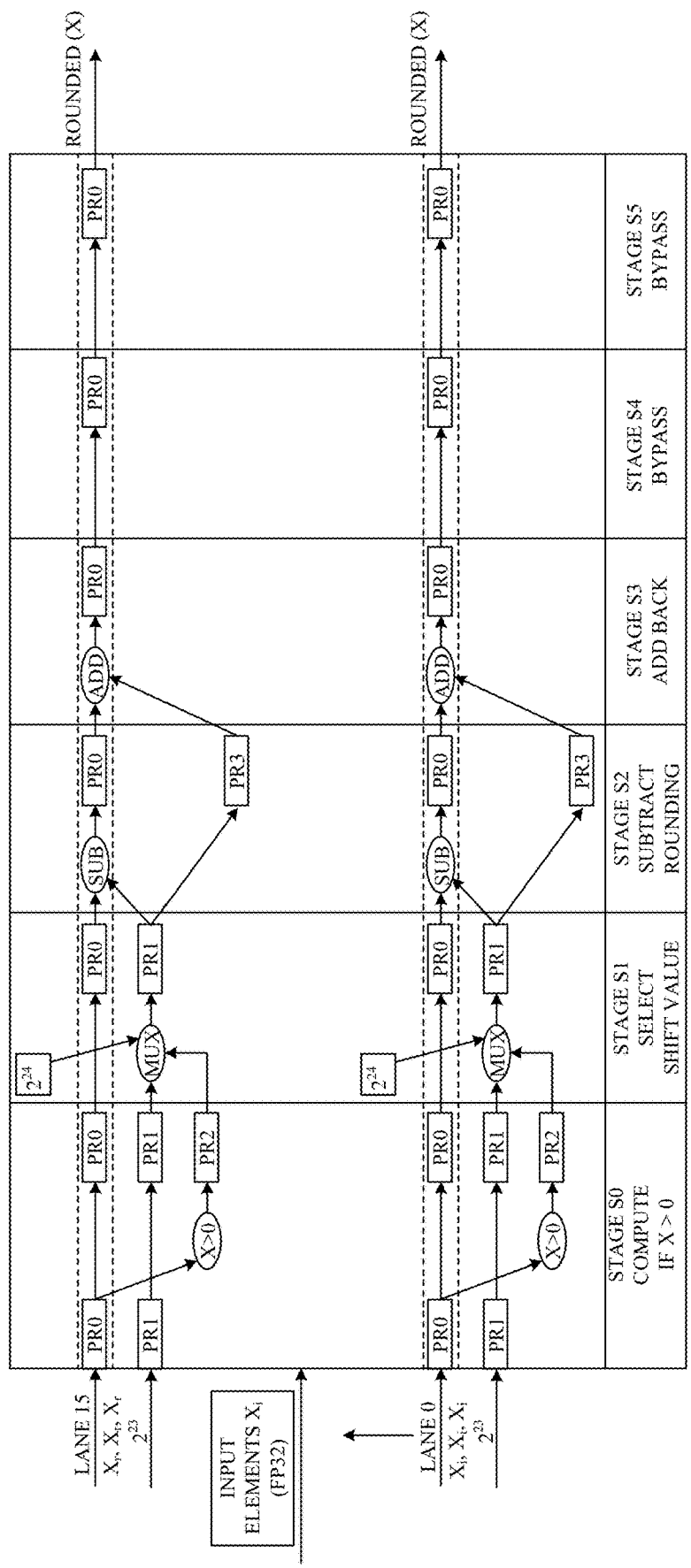
FIGS. 12A-12B illustrates computation units of FIG. 3 (e.g., PCUs) configured to compute an over-approximation (e.g., a ceiling value) of an input element in a second data format, according to various embodiments.
Figure 12B:
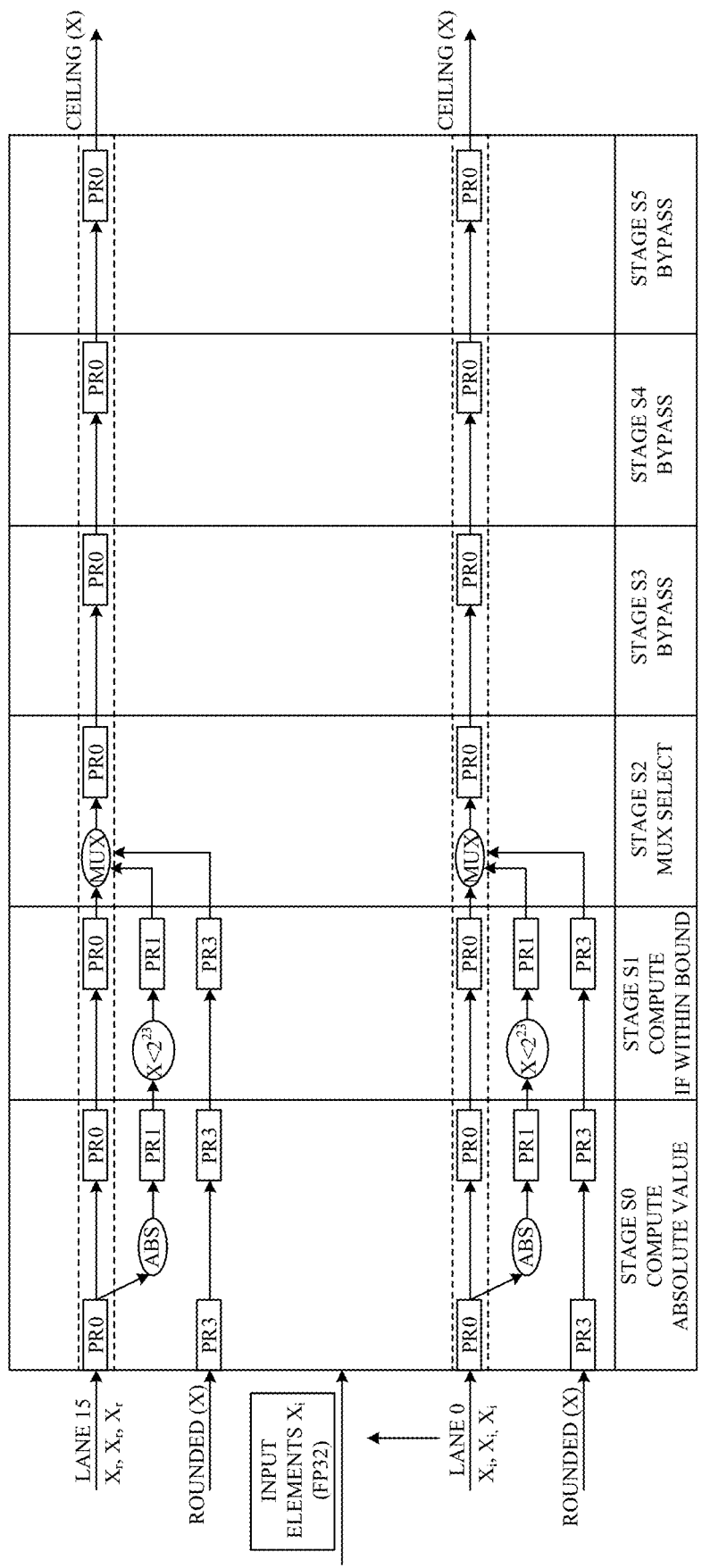

FIGS. 12A-12B illustrates computation units 1200 and 1210 (e.g., PCUs) configured to compute a ceiling value of an input element in a second input format, according to various embodiments. In some embodiments, a ceiling value may be computed with two six-stage computation units (e.g., 1200 and 1210). Each computation unit 1200 and 1210 may include stages: S0, S1, S2, S3, S4, and S5. Each stage of the computation unit 1200 and 1210 may access one or more pipeline registers, e.g., PR0, PR1, PR2, PR3, and so forth. For example, one or more pipeline registers (e.g., PR0 and PR1) may store data between stages of the computation units 1200 and 1210.

FIG. 12A illustrates a first step in computing an overapproximation (e.g., a ceiling value) for an input element $x_i$, according to various embodiments. In some embodiments, the computation unit 1200 may include one or more pipeline registers with pre-loaded values. These pipeline registers may provide inputs to one or more stages of the computation unit 1200. For example, and not by way of limitation, the computation unit 1200 may include a pipeline register PR0 which stores one or more input elements X. In various embodiments, these input elements may be represented in a second format (e.g., FP32). In addition, the computation unit 1200 may include a pipeline register PR1. The pipeline register PR1 may store one or more constant values. For example, and not by way of limitation, the pipeline register PR1 may store constant value $2^{23}$.

In further embodiments, the stage S0 may include one or more functional units. For example, the stage S0 may include a comparator unit. The comparator unit may receive as an input one or more input elements X. For example, the comparator unit may perform a read operation on the pipeline register PR0 to obtain an ith element of input elements X, herein denoted $x_i$. In various embodiments, the input elements X may be represented in a second format (e.g., FP32).

Furthermore, the comparator unit may determine if the input is greater than 0. For example, the comparator unit may compute the sign and/or magnitude of input element $x_i$ to determine if input element $x_i$ is greater than 0. In various embodiments, the comparator unit may perform a read operation on a sign bit of input element $x_i$ (e.g., bit [31] for $x_i$ represented in the FP32 format) to determine the sign of input element $x_i$. In addition, the comparator unit may perform a read operation on one or more bits of the exponent and/or mantissa of input element $x_i$ to determine whether the magnitude of input element $x_i$ is greater than zero. In various embodiments, if the comparator unit determines that input element $x_i$ is greater than zero (e.g., if the sign of input element $x_i$ is positive and the magnitude of input element $x_i$ is greater than zero), then the comparator unit may perform a write operation to write the input element $x_i$ and/or a Boolean indicator of value 1 to a pipeline register (e.g., pipeline register PR2).

Alternatively, if the comparator unit determines that $x_i$ is not greater than zero (e.g., if the sign of the $x_i$ is not positive and/or if the magnitude of the $x_i$ is no greater than zero), then the comparator unit may perform a write operation to a Boolean indicator of value 0 to the pipeline register (e.g., pipeline register PR2). Accordingly, the comparator unit may function as a discriminator that sorts input elements by their value relative to zero and stores Boolean indicators for each element in a pipeline register (e.g., PR2).

Furthermore, the comparator unit may further classify an input element $x_i$. For example, and not by way of limitation, the comparator unit may analyze one or more bits of the mantissa of the input element $x_i$ and/or the exponent of the input element $x_i$. The comparator unit may determine the least bit that stores a non-zero value (e.g., the $2^2$ bit, the 2-2 bit, the 2-6 bit, etc.). Based on the least non-zero bit, the comparator unit may classify the input element as a type of number (e.g., an integer, a rational number, an irrational number, etc.). The comparator unit may further configure the computation unit 1200 to bypass input elements X that are associated with one or more types of numbers. For example, and not by way of limitation, the comparator unit may configure the computation unit 1200 to bypass input elements X corresponding to integers. Accordingly, in some embodiments, the computation unit 1200 may only process input elements X that include a non-zero mantissa bit (i.e., a fractional part.).

In further embodiments, stage S1 may include a selection (MUX) unit. The MUX unit may perform a read operation on a pipeline register (e.g., PR2) to obtain an input element $x_i$ and/or an Boolean indicator for each input element, $x_i$. In various embodiments, the MUX unit may determine based on the received input elements $x_i$ and/or the Boolean indicator that an input element $x_i$ is greater than zero. In additional embodiments, the MUX unit may also perform a read operation on a pipeline register PR1 to obtain an constant value stored in the pipeline register. For example, the pipeline register PR1 may store a constant value of $2^{23}$. In some embodiments, the constant value may correspond to a data format of the input elements. For example, and not by way of limitation, if the data format for each input element have a dynamic range of (−D, D), then R may be utilized as a constant value, where D and R may be positive numbers and R may be less than D. In various embodiments, R may be chosen based on one or more parameters, such as the value of the largest bit of the data format that represents an input element $x_i$. Furthermore, the MUX unit may obtain one or more additional inputs. For example, and not by way of limitation, the MUX unit may receive as an input a constant value (e.g., D, $2^{24}$).

In various embodiments, the MUX unit may select a shift value S based on the input element $x_i$. For example, in some embodiments, the MUX unit may select a shift value based on whether $x_i$ is greater than 0. For example, the MUX unit may select a larger shift value (e.g., D, $2^{24}$, etc.), for $x_i$ greater than zero. Additionally, or alternatively, the MUX unit may select a smaller shift value (e.g., R, $2^{23}$, etc.), for $x_i$ equal to or less than zero. In various embodiments, the MUX unit may perform a write operation to write the selected shift value S to a pipeline register (e.g., pipeline register PR1). In various embodiments, the pipeline register (e.g., PR1) may also write the selected shift value S to a second pipeline register (e.g., PR3).

In additional embodiments, stage S2 may include one or more subtraction (SUB) units and/or one or more rounding (RND) units, according to various embodiments. In some embodiments, a SUB unit may include a subtraction operator. The subtraction operator may receive two inputs and compute a difference of the two inputs. In various embodiments, the SUB unit may perform a read operation on a pipeline register (e.g., PR0) to obtain an input element $x_i$. The SUB unit may further perform a read operation on a pipeline register (e.g., PR1) to obtain a shift value S. The SUB unit may further input the input element $x_i$ and the shift value S to a subtraction operator. The subtraction operator may compute a difference ($x_i$−S) and output the difference to an RND unit. For example, if $x_i$ is greater than zero, then a larger shift value S may be utilized (e.g., $2^{24}$). If $x_i$ is equal to or less than zero, then a smaller shift value S may be utilized (e.g., $2^{23}$). In various embodiments, the SUB unit may shift the value of an input element $x_i$ from a primary region (e.g., (−R, R) or (−$2^{23}$, $2^{23}$)) to a shifted range (e.g., (−D, −D+R) or (−$2^{24}$, −$2^{23}$)).

For example, the subtraction operator may generate an intermediate data format to represent the difference ($x_i$−S). The subtraction operator may generate the intermediate data format based on an exponent difference: a difference between the exponent of the first input and the exponent of the second input. For example, if the exponent difference is 15 bits, then the subtraction operator may shift the first input by 15 bits relative to the second input. Alternatively, the subtraction operator may shift the second input by 15 bits relative to the first input. Herein, the unchanged input is denoted as the primary input. Shifting an input by one or more bits may alter the data format of that input. For example, and not by way of limitation, shifting the input may adjust the position of one or more mantissa bits, hidden bits, guard bits, round bits, sticky bits, and so forth. Accordingly, shifting the input may produce a data format that includes one or more additional bits of information relative to the input data format. The subtraction operator may further compute a difference between the primary input and the shifted input to compute the difference ($x_i$−S). In various embodiments, the difference may be represented in an intermediate data format. In some embodiments, the intermediate data format may include one or more bits of additional information relative to the data format of the primary input. For example, the primary input may be represented in a FP32 data format with 32 bits, while the intermediate data format may have more than 32 bits (e.g., a 33-bit data format, a 35-bit data format, a 52-bit data format, etc.).

In further embodiments, the RND unit may receive a difference ($x_i$−S) in the intermediate data format from the SUB unit. In various embodiments, the RND unit may perform one or more rounding operations on the difference. For example, and not by way of limitation, the RND unit may include a round-to-zero (RTZ) unit. The RTZ unit may perform a rounding operation by truncating one or more bits from the difference, represented in the intermediate data format. In some embodiments, truncating one or more bits from the difference may convert the difference from the intermediate data format to the data format of the primary input. For example, and not by way of limitation, the data format of the primary input may be a FP32 format with 32 bits. The computed difference may be represented by the intermediate data format with more than 32 bits (e.g., 48 bits). For instance, the intermediate data format may include a mantissa with 16 additional bits relative to the mantissa of the FP32 format. Accordingly, the RTZ unit may truncate 16 bits from the mantissa of the intermediate data format, thereby converting the difference to the FP32 data format. In various embodiments, truncation of the computed difference by the RTZ unit may decrease the magnitude (i.e., absolute value) of the computed difference, thereby rounding a positive number downwards towards zero and rounding a negative number upwards towards zero. Thus, the RTZ unit may produce a rounded difference ($x_i$−S) that rounds up the difference ($x_i$−S) towards zero in the shifted range, e.g., (−$2^{24}$, −$2^{23}$). Accordingly, herein the rounded difference ($x_i$−S) will be denoted as Round ($x_i$−S). The RTZ unit may further perform a write operation to write the Round ($x_i$−S) to a pipeline register (e.g., PR0).

In further embodiments, stage S3 may include one or more addition (ADD) units, according to various embodiments. The ADD units may compute a rounded value for $x_i$, i.e., Round ($x_i$), from the rounded difference ($x_i$−S). For example, and not by way of limitation, an ADD unit may include an addition operator. The addition operator may receive two inputs and may compute a sum of the inputs. Accordingly, in various embodiments, the ADD unit may perform a read operation on a pipeline register (e.g., PR0) to obtain the rounded difference ($x_i$−S). The ADD unit may further perform a read operation on a pipeline register (e.g., PR3) to obtain a shift value S. The ADD unit may further compute the sum of the Round ($x_i$−S) and the shift value S. In various embodiments, computing the sum may shift the Round ($x_i$−S) from the shifted range, e.g., (−$2^{24}$, −$2^{23}$) to the primary range, e.g., (−$2^{23}$, $2^{23}$). In operation, adding the shift value S to the Round ($x_i$−S) in the shifted range, e.g., (−$2^{24}$, −$2^{23}$), may return a modified form of $x_i$. For instance, Round ($x_i$−S)+S=Round ($x_i$). Accordingly, the ADD unit may shift the Round ($x_i$−S) from the shifted range back to the primary range, e.g., (−$2^{23}$, $2^{23}$), to produce Round ($x_i$). The ADD unit may further perform a write operation to write the Round ($x_i$) to a pipeline register (e.g., PR0).

In various embodiments, functional units in stages S4 and S5 may be bypassed. For example, and not by way of limitation, these functional units may be configured to remain in an off state. Accordingly, these functional units may not perform read operations from pipeline registers, computational operations, or write operations to pipeline registers.

FIG. 12B illustrates a second step in computing a ceiling value for an input element $x_i$, according to various embodiments. In some embodiments, the computation unit 1210 may include one or more pipeline registers with pre-loaded values. These pipeline registers may provide inputs to one or more stages of the computation unit 1210. For example, and not by way of limitation, the computation unit 1210 may include a pipeline register PR0 which stores one or more input elements X. In various embodiments, these input elements may be represented in a second format (e.g., FP32). In addition, the computation unit 1210 may include a pipeline register PR3. The pipeline register PR3 may store one or more outputs of the computation unit 1200. For example, and not by way of limitation, the pipeline register PR3 may store one or more Round $(x_i)$ values written by the computation unit 1200 to a pipeline register PR1, accordingly to various embodiments.

In further embodiments, the stage S0 may include one or more functional units. For example, the stage S0 may include an absolute-value (ABS) unit. The ABS unit may receive as an input one or more input elements X. For example, the ABS unit may perform a read operation on the pipeline register PR0 to obtain an $i^{th}$ element of input elements X, herein denoted $x_i$. In various embodiments, the input elements X may be represented in a second format (e.g., FP32).

Furthermore, the ABS unit may compute the absolute value of the input element $x_i$. For example, and not by way of limitation, the ABS unit may compute the absolute value by determining a magnitude of the input element $x_i$. For instance, if the input element $x_i$ is represented in the FP32 data format, then the ABS unit may compute the magnitude of the exponent bits and mantissa bits (i.e., bits [30:0]), while omitting the sign bit (i.e., bit [31]). Additionally or alternatively, the ABS unit may include a multiplication operator that computes the product of $x_i$ and $x_i$, the product being $x_i \times x_i = x_i^2$. The ABS unit may further include a square root operator. In various embodiments, the square root operator may receive the product $x_i^2$ as an input and may further compute the square root of the product, the square root being $\sqrt{(x_i^2)}$. In various embodiments, the square root of the product may be the absolute value of $x_i$, denoted ABS $(x_i)$. Accordingly, the square root of the product or $\sqrt{(x_i^2)}$ =ABS $(x_i)=|x_i|$. For example, the square root operator may implement one or more root-finding algorithms in computing the square root of $x_i^2$, including, for example and not by way of limitation, Newton's method, and so forth. In various embodiments, the ABS unit may write ABS $(x_i)$ to a pipeline register (e.g., PR1).

In further embodiments, the stage S1 may include one or more functional units. For example, the stage S0 may include a comparator unit. The comparator unit may receive as an input the absolute value of one or more input elements X. For example, the comparator unit may perform a read operation on the pipeline register PR1 to obtain an absolute value for an $i^{th}$ element of input elements X, herein denoted ABS $(x_i)$.

Furthermore, the comparator unit may determine if the input is within a bound, e.g., R, $2^{23}$, etc. In various embodiments, the bound may correspond to a primary range corresponding to a data format utilized to represent elements of input elements X. In some embodiments, computing Round $(x_i)$ for input elements $x_i$ with absolute values that fall outside of the bound may lead to computational errors. Accordingly, the computation unit 1210 may determine if the absolute value of each input element $x_i$ fall within the bound and further input the result to a subsequent computational stage.

For example, and by way of limitation, the comparator unit may perform a bit-wise comparison between the inputs ABS $(x_i)$ and the bound. In some embodiments, the comparator unit may include a comparator operator that may perform a bit-wise comparison of one or more bits of the exponent of each input: the ABS $(x_i)$ and the bound. The comparator operator may compare the values stored in the largest bit of the exponents for each input. If the values are the same, then the comparator operator may continue to the next largest bit and perform another comparison. If the values are similar for all exponent bits, then the comparator operator may continue by comparing the values of the inputs for each mantissa bit. If the values are similar for the exponent bits and the mantissa bits, then the comparator operator may output to the comparator unit the value of the bound, e.g., $2^{23}$. If the values are different for at least one exponent bit and/or at least one mantissa bit, then the comparator operator may select the input with the largest value for the largest exponent bit as the greater input. If the values for each of the exponent bits are similar for both inputs, then the comparator operator may select the input with the largest value for the largest mantissa bit as the greater input. The comparator operator may output the result to the comparator unit. In various embodiments, if the comparator unit receives the value of the bound, e.g., $2^{23}$, then the comparator unit may determine that the input is not within the bound. If the comparator unit determines that the input is not less than a bound, e.g., $2^{23}$, then the comparator unit may write a Boolean variable of 0 to a pipeline register (e.g., PR1). Additionally, or alternatively, if the comparator unit receives a value that is not the bound, then the comparator unit may determine that the ABS $(x_i)$ is less than the bound. In various embodiments, if the comparator unit determines that the input is less than the bound, then the comparator unit may write the ABS $(x_i)$ and/or a Boolean variable of 1 to a pipeline register (e.g., PR1). Accordingly, the pipeline register PR1 may store an indicator (e.g., ABS $(x_i)$ and/or a Boolean variable of 1), which indicates if the ABS $(x_i)$ is within a bound, e.g., $2^{23}$.

In additional embodiments, stage S2 may include one or more selection (MUX) units. A MUX unit may receive two or more inputs and output the greater of the two inputs. For example, the MUX unit may perform a read operation on a pipeline register (e.g., PR0) to obtain a input value $x_i$. In various embodiments, the MUX unit may also perform a read operation on a pipeline register (e.g., PR2) to obtain Round $(x_i)$ that may be generated by a computation unit 1200, in various embodiments. The MUX unit may also perform a read operation on a pipeline register (e.g., PR1) to receive an indicator. In various embodiments, the indicator may indicate if ABS $(x_i)$ is within a bound, e.g., $2^{23}$.

In various embodiments, the MUX unit may select an input that includes a maximum value. For example, and not by way of limitation, the MUX unit may access the indicator to determine if the ABS $(x_i)$ is within a bound. If the MUX unit determines that ABS $(x_i)$ is within the bound, then the MUX unit may perform a comparison operation on the inputs: $x_i$ and Round $(x_i)$. For example, and not by way of limitation, the MUX unit may include a comparator operator that executes a bit-wise comparison of the exponent bits and mantissa bits of each of inputs $x_i$ and Round $(x_i)$. The comparator operator may further output the larger of the inputs to the MUX unit. The MUX unit may receive the larger input as an output of the comparator and further write the output to a pipeline register (e.g., PR0). In various embodiments, the output may be designated as Ceiling ($x_i$). In various embodiments, if MUX unit determines that ABS ($x_i$) is not within the bound, then the MUX unit may output $x_i$ to a pipeline register. In various embodiments, the outputted $x_i$ may further be designated as Ceiling ($x_i$).

In various embodiments, functional units in stages S3, S4, and S5 may be bypassed. For example, and not by way of limitation, these functional units may be configured to remain in an off state. Accordingly, these functional units may not perform read operations from pipeline registers, computational operations, or write operations to pipeline registers.

In sum, the computation units 1200 and 1210 compute a ceiling value for an input element $x_i$, herein denoted as Ceiling ($x_i$). For example, computation unit 1200 may receive one or more input elements $x_i$, as well as a constant value, e.g., $2^{23}$ as an input to a stage S0 of the computation unit 1210. The computation unit 1200 may further include a comparator unit that sorts input elements and/or Boolean indicators corresponding to input elements into pipeline registers based on whether the input is greater than zero. The sorted input elements and/or indicators may further be input to a further stage S1 of the computation unit 1200 that includes one or more MUX units. The MUX units may select a shift value for each input element. For example, the MUX units may select a larger shift value for input elements greater than 0 and a smaller shift value for inputs elements less than or equal to zero. In a further stage S2 of the computation unit 1200, a SUB unit may shift the value of an input element from a primary range to a shifted range. Further, an RND unit may compute a rounded value for the shifted input element. In an additional stage S3 of the computation unit 1200, an ADD unit may shifted the rounded value from the shifted range to a primary range. In various embodiments, the rounded value in the primary range may be denoted as Round ($x_i$).

Furthermore, a computation unit 1210 may perform second step in computing the ceiling value for an input element $x_i$, Ceiling ($x_i$). For example, computation unit 1210 may receive one or more input elements $x_i$, as well as one or more rounded values, Round ($x_i$), as an input to a stage S0 of the computation unit 1210. The computation unit 1210 may further include an ABS unit that computes an absolute value of each input element $x_i$, herein denoted as ABS ($x_i$). In an additional stage S1 of the computation unit 1210, a comparator unit may determine if ABS ($x_i$) is within abound, e.g., $2^{23}$. In a further stage S2 of the computation unit 1210, a MUX unit may select the larger of $x_i$ and Round ($x_i$), if ABS ($x_i$) is within the bound. In various embodiments, the MUX unit may output the larger of $x_i$ and Round ($x_i$) to a pipeline register, where the selected larger value is herein denoted as Ceiling ($x_i$).

Accordingly, the computation units 1200 and 1210 compute Ceiling ($x_i$) from an input element $x_i$ by shifting the value of an input element to a shifted range, rounding the input elements in the shifted range, and returning the rounded elements back to a primary range. In addition, the computation unit 1210 reduces the likelihood of errors in computing a ceiling value by comparing each rounded element to a corresponding input element and selecting the maximum of the rounded element and the input element as the Ceiling ($x_i$). In addition, the computation unit 1210 computes the absolute value of each input element ($x_i$) and compares the absolute value to a bound. In various embodiments, the bound may correspond to a primary range corresponding to a data format utilized to represent elements of input elements X. Accordingly, if an input element $x_i$ falls outside of the primary range, then, to minimize the likelihood of computational errors, the computation unit 1210 may select the input element $x_i$ as the Ceiling ($x_i$). For example, shifting input elements that fall outside of the bounded region by a constant shift value may cause these elements to fall outside of a shifted region. In some embodiments, rounding elements that fall outside of the shifted region may lead to computational errors. Thus, the computation units 1200 and 1210 may compute Ceiling ($x_i$) for one or more input elements, while reducing the likelihood of computational errors (e.g., rounding errors) in the computed Ceiling ($x_i$).

Figure 13A:
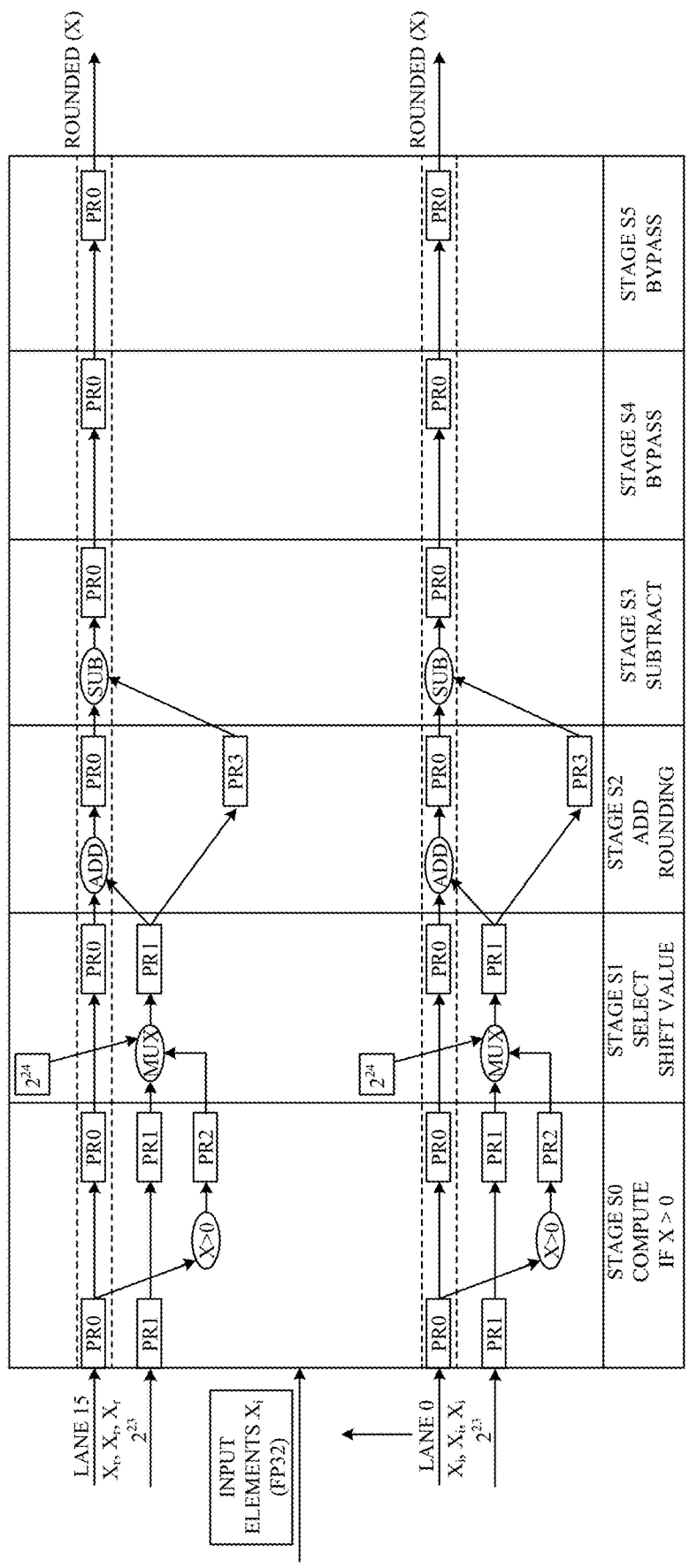
FIGS. 13A-13B illustrates computation units of FIG. 3 (e.g., PCUs) configured to compute an under-approximation (e.g., a floor value) of an input element in a second data format, according to various embodiments.
Figure 13B:
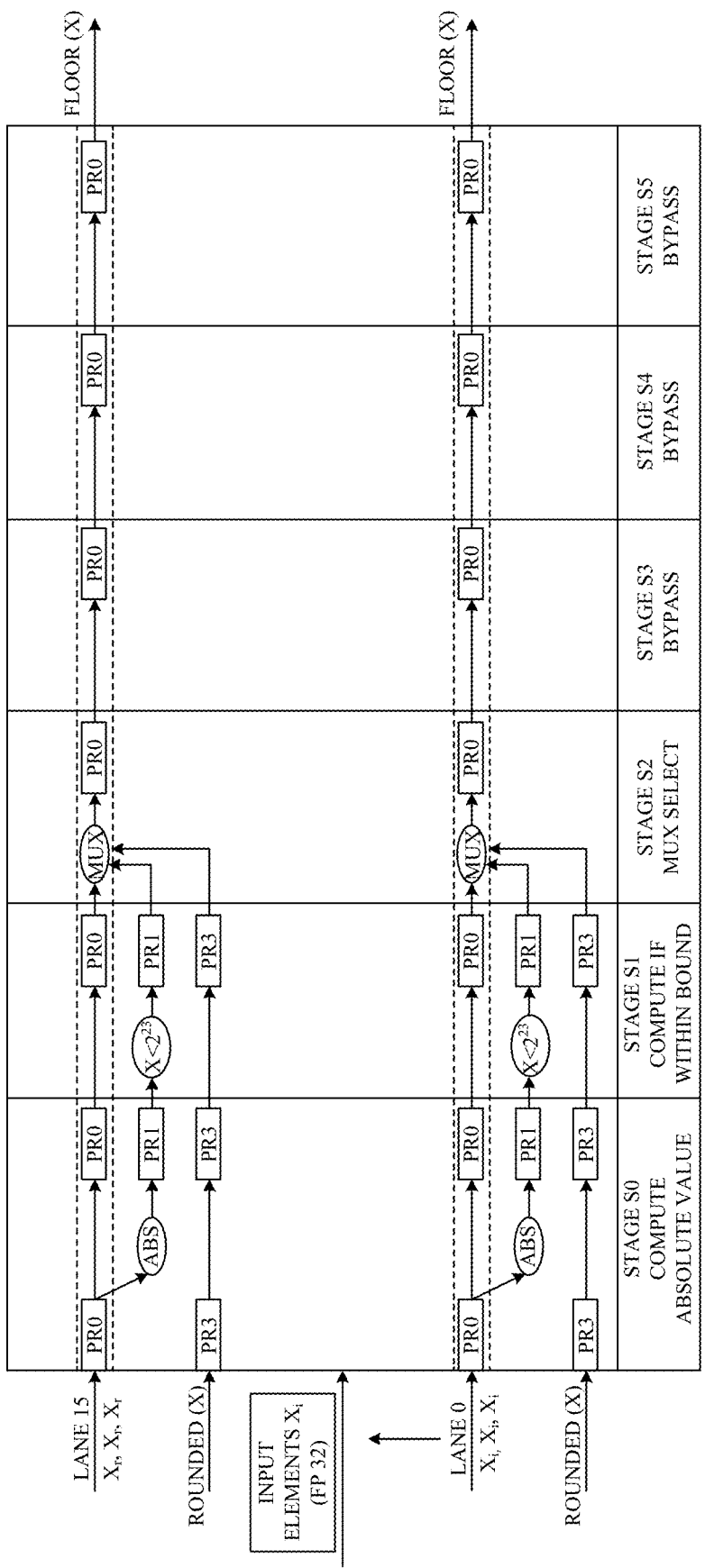

FIGS. 13A-13B illustrates computation units 1300 and 1310 (e.g., PCUs) configured to compute an under-approximation (e.g., a floor value) of an input element in a second input format, according to various embodiments. In some embodiments, a floor value may be computed with two six-stage computation units (e.g., 1300 and 1310). Each computation unit 1300 and 1310 may include stages: S0, S1, S2, S3, S4, and S5. Each stage of the computation unit 1300 and 1310 may access one or more pipeline registers, e.g., PR0, PR1, PR2, PR3, and so forth. For example, one or more pipeline registers (e.g., PR0 and PR1) may store data between stages of the computation units 1300 and 1310.

FIG. 13A illustrates a first step in computing a floor value for an input element $x_i$, according to various embodiments. In some embodiments, the computation unit 1300 may include one or more pipeline registers with pre-loaded values. These pipeline registers may provide inputs to one or more stages of the computation unit 1300. For example, and not by way of limitation, the computation unit 1300 may include a pipeline register PR0 which stores one or more input elements X. In various embodiments, these input elements may be represented in a second format (e.g., FP32). In addition, the computation unit 1300 may include a pipeline register PR1. The pipeline register PR1 may store one or more constant values. For example, and not by way of limitation, the pipeline register PR1 may store constant value $2^{23}$.

In further embodiments, the stage S0 may include one or more functional units. For example, the stage S0 may include a comparator unit. The comparator unit may receive as an input one or more input elements X. For example, the comparator unit may perform a read operation on the pipeline register PR0 to obtain an $i^{th}$ element of input elements X, herein denoted $x_i$. In various embodiments, the input elements X may be represented in a second format (e.g., FP32).

Furthermore, the comparator unit may determine if the input is greater than 0. For example, the comparator unit may compute the sign and/or magnitude of input element $x_i$ to determine if input element $x_i$ is greater than 0. In various embodiments, the comparator unit may perform a read operation on a sign bit of input element $x_i$(e.g., bit [31] for $x_i$ represented in the FP32 format) to determine the sign of input element $x_i$. In addition, the comparator unit may perform a read operation on one or more bits of the exponent and/or mantissa of input element $x_i$ to determine whether the magnitude of input element $x_i$ is greater than zero. In various embodiments, if the comparator unit determines that input element $x_i$ is greater than zero (e.g., if the sign of input element $x_i$ is positive and the magnitude of input element $x_i$ is greater than zero), then the comparator unit may perform a write operation to write the input element $x_i$ and/or a Boolean indicator of value 1 to a pipeline register (e.g., pipeline register PR2).

Alternatively, if the comparator unit determines that $x_i$ is not greater than zero (e.g., if the sign of the $x_i$ is not positive and/or if the magnitude of the $x_i$ is no greater than zero), then the comparator unit may perform a write operation to a Boolean indicator of value 0 to the pipeline register (e.g., pipeline register PR2). Accordingly, the comparator unit may function as a discriminator that sorts input elements by their value relative to zero and stores Boolean indicators for each element in a pipeline register (e.g., PR2).

Furthermore, the comparator unit may further classify an input element $x_i$. For example, and not by way of limitation, the comparator unit may analyze one or more bits of the mantissa of the input element $x_i$ and/or the exponent of the input element $x_i$. The comparator unit may determine the least bit that stores a non-zero value (e.g., the $2^2$ bit, the 2-2 bit, the 2-6 bit, etc.). Based on the least non-zero bit, the comparator unit may classify the input element as a type of number (e.g., an integer, a rational number, an irrational number, etc.). The comparator unit may further configure the computation unit 1300 to bypass input elements X that are associated with one or more types of numbers. For example, and not by way of limitation, the comparator unit may configure the computation unit 1300 to bypass input elements X corresponding to integers. Accordingly, in some embodiments, the computation unit 1300 may only process input elements X that include a non-zero mantissa bit (i.e., a fractional part.).

In further embodiments, stage S1 may include a selection (MUX) unit. The MUX unit may perform a read operation on a pipeline register (e.g., PR2) to obtain an input element $x_i$ and/or a Boolean indicator for each input element, $x_i$. In various embodiments, the MUX unit may determine based on the received input elements $x_i$ and/or the Boolean indicator that an input element $x_i$ is greater than zero. In additional embodiments, the MUX unit may also perform a read operation on a pipeline register PR1 to obtain a constant value stored in the pipeline register. For example, the pipeline register PR1 may store a constant value of $2^{23}$. In some embodiments, the constant value may correspond to a data format of the input elements. For example, and not by way of limitation, if the data format for each input element have a dynamic range of (−D, D), then R may be utilized as a constant value, where D and R may be positive numbers and R may be less than D. In various embodiments, R may be chosen based on one or more parameters, such as the value of the largest bit of the data format that represents an input element $x_i$. Furthermore, the MUX unit may obtain one or more additional inputs. For example, and not by way of limitation, the MUX unit may receive as an input a constant value (e.g., D, $2^{24}$).

In various embodiments, the MUX unit may select a shift value S based on the input element $x_i$. For example, in some embodiments, the MUX unit may select a shift value based on whether $x_i$ is greater than 0. For example, the MUX unit may select a larger shift value (e.g., D, $2^{24}$, etc.), for $x_i$ greater than zero. Additionally, or alternatively, the MUX unit may select a smaller shift value (e.g., R, $2^{23}$, etc.), for $x_i$ equal to or less than zero. In various embodiments, the MUX unit may perform a write operation to write the selected shift value S to a pipeline register (e.g., pipeline register PR1). In various embodiments, the pipeline register (e.g., PR1) may also write the selected shift value S to a second pipeline register (e.g., PR3).

In additional embodiments, stage S2 may include one or more addition (ADD) units and/or one or more rounding (RND) units, according to various embodiments. In some embodiments, an ADD unit may include an addition operator. The addition operator may receive two inputs and compute a sum of the two inputs. In various embodiments, the ADD unit may perform a read operation on a pipeline register (e.g., PR0) to obtain an input element $x_i$. The ADD unit may further perform a read operation on a pipeline register (e.g., PR1) to obtain a shift value S. The ADD unit may further input the input element $x_i$ and the shift value S to an addition operator. The addition operator may compute a sum ($x_i$+S) and output the sum to a RND unit. For example, if $x_i$ is greater than zero, then a smaller shift value S may be utilized (e.g., $2^{23}$). If $x_i$ is equal to or less than zero, then a larger shift value S may be utilized (e.g., $2^{24}$). In various embodiments, the ADD unit may shift the value of an input element $x_i$ from a primary region (e.g., (−R, R) or (−$2^{23}$, $2^{23}$)) to a shifted range (e.g., (D−R, D) or ($2^{23}$, $2^{24}$)).

For example, the addition operator may generate an intermediate data format to represent the sum ($x_i$+S). The addition operator may generate the intermediate data format based on an exponent difference: a difference between the exponent of the first input and the exponent of the second input. For example, if the exponent difference is 15 bits, then the addition operator may shift the first input by 15 bits relative to the second input. Alternatively, the addition operator may shift the second input by 15 bits relative to the first input. Herein, the unchanged input is denoted as the primary input. Shifting an input by one or more bits may alter the data format of that input. For example, and not by way of limitation, shifting the input may adjust the position of one or more mantissa bits, hidden bits, guard bits, round bits, sticky bits, and so forth. Accordingly, shifting the input may produce a data format that includes one or more additional bits of information relative to the input data format. The addition operator may further compute a difference between the primary input and the shifted input to compute the sum ($x_i$+S). In various embodiments, the sum may be represented in an intermediate data format. In some embodiments, the intermediate data format may include one or more bits of additional information relative to the data format of the primary input. For example, the primary input may be represented in a FP32 data format with 32 bits, while the intermediate data format may have more than 32 bits (e.g., a 33-bit data format, a 36-bit data format, a 54-bit data format, etc.).

In further embodiments, the RND unit may receive a sum ($x_i$+S) in the intermediate data format from the ADD unit. In various embodiments, the RND unit may perform one or more rounding operations on the sum. For example, and not by way of limitation, the RND unit may include a round-to-zero (RTZ) unit. The RTZ unit may perform a rounding operation by truncating one or more bits from the sum, represented in the intermediate data format. In some embodiments, truncating one or more bits from the sum may convert the sum from the intermediate data format to the data format of the primary input. For example, and not by way of limitation, the data format of the primary input may be a FP32 format with 32 bits. The computed sum may be represented by the intermediate data format with more than 32 bits (e.g., 48 bits). For instance, the intermediate data format may include a mantissa with 16 additional bits relative to the mantissa of the FP32 format. Accordingly, the RTZ unit may truncate 16 bits from the mantissa of the intermediate data format, thereby converting the sum to the FP32 data format. In various embodiments, truncation of the computed sum by the RTZ unit may decrease the magnitude (i.e., absolute value) of the computed sum, thereby rounding a positive number downwards towards zero and rounding a negative number upwards towards zero. Thus, the RTZ unit may produce a rounded sum $(x_i+S)$ that rounds down the sum $(x_i+S)$ towards zero in the shifted range, e.g., $(2^{23}, 2^{24})$. Accordingly, herein the rounded sum $(x_i+S)$ will be denoted as Round $(x_i+S)$. The RTZ unit may further perform a write operation to write the Round $(x_i+S)$ to a pipeline register (e.g., PR0).

In further embodiments, stage S3 may include one or more subtraction (SUB) units, according to various embodiments. The SUB units may compute a rounded value for $x_i$, i.e., Rounded $(x_i)$, from the rounded sum $(x_i+S)$. For example, and not by way of limitation, a SUB unit may include a subtraction operator. The subtraction operator may receive two inputs and may compute a difference of the inputs. Accordingly, in various embodiments, the SUB unit may perform a read operation on a pipeline register (e.g., PR0) to obtain the rounded sum $(x_i+S)$. The SUB unit may further perform a read operation on a pipeline register (e.g., PR3) to obtain a shift value S. The SUB unit may further compute the difference of the Round $(x_i+S)$ and the shift value S. In various embodiments, computing the difference may shift the Round $(x_i+S)$ from the shifted range, e.g., $(2^{23}, 2^{24})$ to the primary range, e.g., $(-2^{23}, 2^{23})$. In operation, subtracting the shift value S from the Round $(x_i+S)$ in the shifted range, e.g., $(2^{23}, 2^{24})$, may return a modified form of $x_i$. For instance, Round $(x_i+S)-S=$Round $(x_i)$. Accordingly, the SUB unit may shift the Round $(x_i+S)$ from the shifted range back to the primary range, e.g., $(-2^{23}, 2^{23})$, to produce Round $(x_i)$. The SUB unit may further perform a write operation to write the Round $(x_i)$ to a pipeline register (e.g., PR0).

In various embodiments, functional units in stages S4 and S5 may be bypassed. For example, and not by way of limitation, these functional units may be configured to remain in an off state. Accordingly, these functional units may not perform read operations from pipeline registers, computational operations, or write operations to pipeline registers.

FIG. 13B illustrates a second step in computing a floor value for an input element $x_i$, according to various embodiments. In some embodiments, the computation unit 1310 may include one or more pipeline registers with pre-loaded values. These pipeline registers may provide inputs to one or more stages of the computation unit 1310. For example, and not by way of limitation, the computation unit 1310 may include a pipeline register PR0 which stores one or more input elements X. In various embodiments, these input elements may be represented in a second format (e.g., FP32). In addition, the computation unit 1310 may include a pipeline register PR3. The pipeline register PR3 may store one or more outputs of the computation unit 1300. For example, and not by way of limitation, the pipeline register PR3 may store one or more Round $(x_i)$ values written by the computation unit 1300 to a pipeline register PR1, accordingly to various embodiments.

In further embodiments, the stage S0 may include one or more functional units. For example, the stage S0 may include an absolute-value (ABS) unit. The ABS unit may receive as an input one or more input elements X. For example, the ABS unit may perform a read operation on the pipeline register PR0 to obtain an $i^{th}$ element of input elements X, herein denoted $x_i$. In various embodiments, the input elements X may be represented in a second format (e.g., FP32).

Furthermore, the ABS unit may compute the absolute value of the input element $x_i$. For example, and not by way of limitation, the ABS unit may compute the absolute value by determining a magnitude of the input element $x_i$. For instance, if the input element $x_i$ is represented in the FP32 data format, then the ABS unit may compute the magnitude of the exponent bits and mantissa bits (i.e., bits [30:0]), while omitting the sign bit (i.e., bit [31]). Additionally or alternatively, the ABS unit may include a multiplication operator that computes the product of $x_i$ and $x_i$, the product being $x_i \times x_i = x_i^2$. The ABS unit may further include a square root operator. In various embodiments, the square root operator may receive the product $x_i^2$ as an input and may further compute the square root of the product, the square root being $\sqrt{(x_i^2)}$. In various embodiments, the square root of the product may be the absolute value of $x_i$, denoted ABS $(x_i)$. Accordingly, the square root of the product or $\sqrt{(x_i^2)}$ =ABS $(x_i)=|x_i|$. For example, the square root operator may implement one or more root-finding algorithms in computing the square root of $x_i^2$, including, for example and not by way of limitation, Newton's method, and so forth. In various embodiments, the ABS unit may write ABS $(x_i)$ to a pipeline register (e.g., PR1).

In further embodiments, the stage S1 may include one or more functional units. For example, the stage S0 may include a comparator unit. The comparator unit may receive as an input the absolute value of one or more input elements X. For example, the comparator unit may perform a read operation on the pipeline register PR1 to obtain an absolute value for an $i^{th}$ element of input elements X, herein denoted ABS $(x_i)$.

Furthermore, the comparator unit may determine if the input is within a bound, e.g., R, $2^{23}$, etc. In various embodiments, the bound may correspond to a primary range corresponding to a data format utilized to represent elements of input elements X. In some embodiments, computing Round $(x_i)$ for input elements $x_i$ with absolute values that fall outside of the bound may lead to computational errors. Accordingly, the computation unit 1310 may determine if the absolute value of each input element $x_i$ fall within the bound and further input the result to a subsequent computational stage.

For example, and by way of limitation, the comparator unit may perform a bit-wise comparison between the inputs ABS $(x_i)$ and the bound. In some embodiments, the comparator unit may include a comparator operator that may perform a bit-wise comparison of one or more bits of the exponent of each input: the ABS $(x_i)$ and the bound. The comparator operator may compare the values stored in the largest bit of the exponents for each input. If the values are the same, then the comparator operator may continue to the next largest bit and perform another comparison. If the values are similar for all exponent bits, then the comparator operator may continue by comparing the values of the inputs for each mantissa bit. If the values are similar for the exponent bits and the mantissa bits, then the comparator operator may output to the comparator unit the value of the bound, e.g., $2^{23}$. If the values are different for at least one exponent bit and/or at least one mantissa bit, then the comparator operator may select the input with the largest value for the largest exponent bit as the greater input. If the values for each of the exponent bits are similar for both inputs, then the comparator operator may select the input with the largest value for the largest mantissa bit as the greater input. The comparator operator may output the result to the comparator unit. In various embodiments, if the comparator unit receives the value of the bound, e.g., $2^{23}$, then the comparator unit may determine that the input is not within the bound. If the comparator unit determines that the input is not less than a bound, e.g., $2^{23}$, then the comparator unit may write a Boolean variable of 0 to a pipeline register (e.g., PR1). Additionally, or alternatively, if the comparator unit receives a value that is not the bound, then the comparator unit may determine that the ABS $(x_i)$ is less than the bound. In various embodiments, if the comparator unit determines that the input is less than the bound, then the comparator unit may write the ABS $(x_i)$ and/or a Boolean variable of 1 to a pipeline register (e.g., PR1). Accordingly, the pipeline register PR1 may store an indicator (e.g., ABS $(x_i)$ and/or a Boolean variable of 1), which indicates if the ABS $(x_i)$ is within a bound, e.g., $2^{23}$.

In additional embodiments, stage S2 may include one or more selection (MUX) units. A MUX unit may receive two or more inputs and output the greater of the two inputs. For example, the MUX unit may perform a read operation on a pipeline register (e.g., PR0) to obtain a input value $x_i$. In various embodiments, the MUX unit may also perform a read operation on a pipeline register (e.g., PR2) to obtain Round $(x_i)$ that may be generated by a computation unit 1300, in various embodiments. The MUX unit may also perform a read operation on a pipeline register (e.g., PR1) to receive an indicator. In various embodiments, the indicator may indicate if ABS $(x_i)$ is within a bound, e.g., $2^{23}$.

In various embodiments, the MUX unit may select an input that includes a minimum value. For example, and not by way of limitation, the MUX unit may access the indicator to determine if the ABS $(x_i)$ is within a bound. If the MUX unit determines that ABS $(x_i)$ is within the bound, then the MUX unit may perform a comparison operation on the inputs: $x_i$ and Round $(x_i)$. For example, and not by way of limitation, the MUX unit may include a comparator operator that executes a bit-wise comparison of the exponent bits and mantissa bits of each of inputs $x_i$ and Round $(x_i)$. The comparator operator may further output the smaller of the inputs to the MUX unit. The MUX unit may receive the smaller input as an output of the comparator and further write the output to a pipeline register (e.g., PR0). In various embodiments, the output may be designated as floor $(x_i)$. In various embodiments, if MUX unit determines that ABS $(x_i)$ is not within the bound, then the MUX unit may output $x_i$ to a pipeline register. In various embodiments, the outputted $x_i$ may further be designated as floor $(x_i)$.

In various embodiments, functional units in stages S3, S4, and S5 may be bypassed. For example, and not by way of limitation, these functional units may be configured to remain in an off state. Accordingly, these functional units may not perform read operations from pipeline registers, computational operations, or write operations to pipeline registers.

In sum, the computation units 1300 and 1310 compute a floor value for an input element $x_i$, herein denoted as floor $(x_i)$. For example, computation unit 1300 may receive one or more input elements $x_i$, as well as a constant value, e.g., $2^{23}$ as an input to a stage S0 of the computation unit 1310. The computation unit 1300 may further include a comparator unit that sorts input elements and/or Boolean indicators corresponding to input elements into pipeline registers based on whether the input is greater than zero. The sorted input elements and/or indicators may further be input to a further stage S1 of the computation unit 1300 that includes one or more MUX units. The MUX units may select a shift value for each input element. For example, the MUX units may select a smaller shift value for input elements greater than 0 and a larger shift value for inputs elements less than or equal to zero. In a further stage S2 of the computation unit 1300, a ADD unit may shift the value of an input element from a primary range to a shifted range. Further, a RND unit may compute a rounded value for the shifted input element. In an additional stage S3 of the computation unit 1300, a SUB unit may shifted the rounded value from the shifted range to a primary range. In various embodiments, the rounded value in the primary range may be denoted as Round $(x_i)$.

Furthermore, a computation unit 1310 may perform second step in computing the floor value for an input element $x_i$, floor $(x_i)$. For example, computation unit 1310 may receive one or more input elements $x_i$, as well as one or more rounded values, Round $(x_i)$, as an input to a stage S0 of the computation unit 1310. The computation unit 1310 may further include an ABS unit that computes an absolute value of each input element $x_i$, herein denoted as ABS $(x_i)$. In an additional stage S of the computation unit 1310, a comparator unit may determine if ABS $(x_i)$ is within a bound, e.g., $2^{23}$. In a further stage S2 of the computation unit 1310, a MUX unit may select the smaller of $x_i$ and Round $(x_i)$, if ABS $(x_i)$ is within the bound. In various embodiments, the MUX unit may output the smaller of $x_i$ and Round $(x_i)$ to a pipeline register, where the selected smaller value is herein denoted as floor $(x_i)$.

Accordingly, the computation units 1300 and 1310 compute floor $(x_i)$ from an input element $x_i$ by shifting the value of an input element to a shifted range, rounding the input elements in the shifted range, and returning the rounded elements back to a primary range. In addition, the computation unit 1310 reduces the likelihood of errors in computing a floor value by comparing each rounded element to a corresponding input element and selecting the minimum of the rounded element and the input element as the floor $(x_i)$. In addition, the computation unit 1310 computes the absolute value of each input element $(x_i)$ and compares each absolute value to a bound. In various embodiments, the bound may correspond to a primary range corresponding to a data format utilized to represent elements of input elements X. Accordingly, if an input element $x_i$ falls outside of the primary range, then, to minimize the likelihood of computational errors, the computation unit 1310 may select the input element $x_i$ as the floor $(x_i)$. For example, shifting input elements that fall outside of the bounded region by a constant shift value may cause these elements to fall outside of a shifted region. In some embodiments, rounding elements that fall outside of the shifted region may lead to computational errors. Thus, the computation units 1300 and 1310 may compute floor $(x_i)$ for one or more input elements, while reducing the likelihood of computational errors (e.g., rounding errors) in the computed floor $(x_i)$.

In summary, a computation unit may include a first circuit to compute a first projection $\pi$ of an input element $x_i$ from a first range to a second range. In the first circuit, the input element $x_i$ may have a first format and a projected element $y_i$ may have a second format. In addition, in the first circuit, the second format having more bits than the first format. Furthermore, the computation unit may include a second circuit operatively coupled to the first circuit to produce a reduction $z_i$ in the first format using the projected element $y_i$ in the second format. Moreover, the computation unit may include a third circuit operatively coupled to the second circuit to compute a second projection $\rho$ of the reduction $z_i$ from the second range to the first range to produce an approximation $w_i$.

In various embodiments, in the computation unit, the second range may include a boundary of the first format.

In additional embodiments, in the computation unit, the first projection π may shift at least one bit of the input element $x_i$ in the first format to produce the projected element $y_i$ in the second format.

In further embodiments, in the computation unit, the second projection ρ may perform an inverse operation of the first projection π.

Moreover, in the computation unit, the approximation $w_i$ may be an over-approximation or an under-approximation of the input element $x_i$.

Furthermore, in the computation unit, the first circuit may selects a shift value S to apply in the first projection π.

In addition, in the computation unit, the second circuit may truncate one or more bits of the projected element $y_i$ to produce the reduction $z_i$.

Also, the computation unit may include a fourth circuit which may select an output from the input element $x_i$ and the approximation $w_i$.

Further, in the computation unit, the first circuit may shift at least one bit of the input element $x_i$ based on an exponent difference between one or more exponent bits of the input element $x_i$ and one or more exponent bits of a shift value S to produce the second format.

In some embodiments, in the computation unit, the first circuit may, when computing an over-approximation, select a larger shift value if the input element $x_i$ is greater than zero and select a smaller shift value if the input element $x_i$ is less than zero. The first circuit may also, when computing an under-approximation, select a smaller shift value if the input element $x_i$ is greater than zero and select a larger shift value if the input element $x_i$ is less than zero.

In various embodiments, in the computation unit, the first circuit may, when computing an over-approximation, subtract the shift value S from the input element $x_i$ to produce a difference $(x_i-S)$ and when computing an under-approximation, add the shift value S to the input element $x_i$ to produce a sum $(x_i+S)$.

In additional embodiments, in the computation unit, truncating one or more bits may round the projected element $y_i$ towards zero.

In further embodiments, in the computation unit, the fourth circuit may compute an absolute value of the input element $x_i$.

In addition, in the computation unit, the larger shift value may correspond to a boundary of the first format and the smaller shift value may correspond to a boundary of the first range.

Furthermore, in the computation unit, when computing the over-approximation, the second range may correspond to a negative boundary of the first format, and when computing the under-approximation, the second range may correspond to a positive boundary of the first format.

Moreover, in the computation unit, the third circuit may, when computing the over-approximation, add the shift value to a rounded difference $(x_i-S)$ and, when computing the under-approximation, subtract the shift value from a rounded sum $(x_i+S)$.

Also, in the computation unit, the first circuit may select the shift value S based on the first format of the input element $x_i$.

Further, in the computation unit, the first circuit may bypass an input element $x_i$, if one or more bits of the mantissa of the input element $x_i$ is zero.

In some embodiments, in the computation unit, the fourth circuit may additionally determine a boundary of the first range and compare the absolute value to the boundary. If the absolute value is greater than the boundary, then the fourth circuit may select the input element $x_i$ as the output. If the absolute value is less than the boundary, then the fourth circuit may select the approximation $w_i$ as the output.

In various embodiments, a re-configurable processor may comprise a first circuit to compute a first projection π of an input element $x_i$ from a first range to a second range. In the re-configurable processor, the first circuit may include an input element $x_i$ having a first format and a projected element $y_i$ having a second format. In addition, in the first circuit, the second format may have more bits than the first format. Furthermore, the re-configurable processor may include a second circuit operatively coupled to the first circuit to produce a reduction $z_i$ in the first format using the projected element $y_i$ in the second format. Moreover, the re-configurable processor may include a third circuit operatively coupled to the second circuit to compute a second projection ρ of the reduction $z_i$ from the second range to the first range to produce an approximation $w_i$.

In further embodiments, a method for computing an element approximation is disclosed. The method includes computing, by a first circuit, a first projection π of an input element $x_i$ from a first range to a second range. In the method, the input element $x_i$ has a first format and a projected element $y_i$ has a second format. In the method, the second format has more bits than the first format. The method further includes producing, by a second circuit operatively coupled to the first circuit, a reduction $z_i$ in the first format using the projected element $y_i$ in the second format. In addition, the method includes computing, by a third circuit operatively coupled to the second circuit, a second projection ρ of the reduction $z_i$ from the second range to the first range to produce an approximation $w_i$.

Although examples are described herein based on the use of single precision floating point FP32 format floating point numbers, the technique is applicable to other data encoding formats, including, for example, double-precision floating-point FP64 format numbers, binary format numbers, and other encoding formats.

While the present disclosure is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A computation unit, comprising:
   a first circuit to compute a first projection π of an input element $x_i$ from a first range to a second range, the input element $x_i$ having a first format and a projected element $y_i$ having a second format, the second format having more bits than the first format;
   a second circuit operatively coupled to the first circuit to produce a reduction $z_i$ in the first format using the projected element $y_i$ in the second format; and
   a third circuit operatively coupled to the second circuit to compute a second projection ρ of the reduction $z_i$ from the second range to the first range to produce an approximation $w_i$.

2. The computation unit of claim 1, wherein the second range comprises a boundary of the first format.

3. The computation unit of claim 1, wherein the first projection π shifts at least one bit of the input element $x_i$ in the first format to produce the projected element $y_i$ in the second format.

4. The computation unit of claim 3, wherein the first circuit shifts the at least one bit of the input element $x_i$ based on an exponent difference between one or more exponent bits of the input element $x_i$ and one or more exponent bits of a shift value S to produce the second format.

5. The computation unit of claim 1, wherein the second projection $\rho$ is an inverse operation of the first projection $\pi$.

6. The computation unit of claim 1, wherein the approximation $w_i$ may be an over-approximation or an under-approximation of the input element $x_i$.

7. The computation unit of claim 6, wherein the first circuit:
when computing an over-approximation, selects a larger shift value if the input element $x_i$ is greater than zero and selects a smaller shift value if the input element $x_i$ is less than zero; and
when computing an under-approximation, selects a smaller shift value if the input element $x_i$ is greater than zero and selects a larger shift value if the input element $x_i$ is less than zero.

8. The computation unit of claim 7, wherein the larger shift value corresponds to a boundary of the first format and the smaller shift value corresponds to a boundary of the first range.

9. The computation unit of claim 7, wherein:
when computing the over-approximation, the second range corresponds to a negative boundary of the first format; and
when computing the under-approximation, the second range corresponds to a positive boundary of the first format.

10. The computation unit of claim 1, wherein the first circuit selects a shift value S to apply in the first projection $\pi$.

11. The computation unit of claim 10, wherein the first circuit:
when computing an over-approximation, subtracts the shift value S from the input element $x_i$ to produce a difference $(x_i - S)$; and
when computing an under-approximation, adds the shift value S to the input element $x_i$ to produce a sum $(x_i + S)$.

12. The computation unit of claim 11, wherein the third circuit:
when computing the over-approximation, adds the shift value to a rounded difference $(x_i - S)$; and
when computing the under-approximation, subtracts the shift value from a rounded sum $(x_i + S)$.

13. The computation unit of claim 11, wherein the first circuit selects the shift value S based on the first format of the input element $x_i$.

14. The computation unit of claim 11, wherein the first circuit bypasses an input element $x_i$, if one or more bits of a mantissa of the input element $x_i$ is zero.

15. The computation unit of claim 1, wherein the second circuit truncates one or more bits of the projected element $y_i$ to produce the reduction $z_i$.

16. The computation unit of claim 15, wherein truncating the one or more bits rounds the projected element $y_i$ towards zero.

17. The computation unit of claim 1, further comprising a fourth circuit, wherein the fourth circuit selects an output from the input element $x_i$ and the approximation $w_i$.

18. The computation unit of claim 17, wherein the fourth circuit computes an absolute value of the input element $x_i$.

19. The computation unit of claim 18, wherein the fourth circuit:
determines a boundary of the first range; and
compares the absolute value to the boundary,
wherein, the fourth circuit:
if the absolute value is greater than the boundary, selects the input element $x_i$ as the output; and
if the absolute value is less than the boundary, selects the approximation $w_i$ as the output.

20. A re-configurable processor, comprising:
a first circuit to compute a first projection $\pi$ of an input element $x_i$ from a first range to a second range, the input element $x_i$ having a first format and a projected element $y_i$ having a second format, the second format having more bits than the first format;
a second circuit operatively coupled to the first circuit to produce a reduction $z_i$ in the first format using the projected element $y_i$ in the second format; and
a third circuit operatively coupled to the second circuit to compute a second projection $\rho$ of the reduction $z_i$ from the second range to the first range to produce an approximation $w_i$.

21. A method, comprising:
computing, by a first circuit, a first projection $\pi$ of an input element $x_i$ from a first range to a second range, the input element $x_i$ having a first format and a projected element $y_i$ having a second format, the second format having more bits than the first format;
producing, by a second circuit operatively coupled to the first circuit, a reduction $z_i$ in the first format using the projected element $y_i$ in the second format; and
computing, by a third circuit operatively coupled to the second circuit, a second projection $\rho$ of the reduction $z_i$ from the second range to the first range to produce an approximation $w_i$.

* * * * *